US012706029B2

(12) United States Patent
Shin et al.

(10) Patent No.: US 12,706,029 B2
(45) Date of Patent: Aug. 11, 2026

(54) DISPLAY DEVICE AND ELECTRONIC DEVICE INCLUDING THE SAME

(71) Applicant: Samsung Display Co., Ltd., Yongin-si (KR)

(72) Inventors: Dong Hee Shin, Yongin-si (KR); Sun Kwun Son, Yongin-si (KR); Na Hyeon Cha, Yongin-si (KR)

(73) Assignee: Samsung Display Co., Ltd, Yongin-si (KR)

( * ) Notice: Subject to any disclaimer, the term of this patent is extended or adjusted under 35 U.S.C. 154(b) by 0 days.

(21) Appl. No.: 19/192,100

(22) Filed: Apr. 28, 2025

(65) Prior Publication Data

US 2025/0384821 A1 Dec. 18, 2025

(30) Foreign Application Priority Data

Jun. 18, 2024 (KR) ........................ 10-2024-0079218
Jul. 30, 2024 (KR) ........................ 10-2024-0100632

(51) Int. Cl.
*G09G 3/32* (2016.01)

(52) U.S. Cl.
CPC ....... *G09G 3/32* (2013.01); *G09G 2300/0819* (2013.01)

(58) Field of Classification Search
None
See application file for complete search history.

(56) References Cited

U.S. PATENT DOCUMENTS 10,692,411 B2 6/2020 Kim et al.
2018/0175071 A1 * 6/2018 Kasahara ............. H10D 86/421

FOREIGN PATENT DOCUMENTS

KR 10-2010-0056373 A 5/2010
KR 10-2588321 B1 10/2023

* cited by examiner

*Primary Examiner* — Carl Adams
(74) *Attorney, Agent, or Firm* — Womble Bond Dickinson (US) LLP

(57) ABSTRACT

A display device includes a first sub-pixel including a first sub-pixel circuit, and a first light-emitting element configured to emit light based on a first data signal, a second sub-pixel including a second sub-pixel circuit, and a second light-emitting element configured to emit light based on a second data signal, and a third sub-pixel including a third sub-pixel circuit, and a third light-emitting element configured to emit light based on a third data signal, wherein channels of transistors configured to perform a same function among transistors in the first, second, and third sub-pixel circuits are adjacent to each other.

22 Claims, 21 Drawing Sheets

DISPLAY DEVICE AND ELECTRONIC DEVICE INCLUDING THE SAME

CROSS-REFERENCE TO RELATED APPLICATION

The present application claims priority to, and the benefit of, Korean Patent Application 10-2024-0079218, filed on Jun. 18, 2024, and Korean Patent Application 10-2024-0100632, filed on Jul. 30, 2024, in the Korean Intellectual Property Office, the entire disclosures of which are incorporated herein by reference.

BACKGROUND

1. Field

The present disclosure generally relates to a display device, and an electronic device including a display device.

2. Description of the Related Art

With the development of information technologies, the importance of a display device which is a connection medium between a user and information increases. Accordingly, display devices, such as a liquid crystal display device and an organic light-emitting display device are increasingly used.

Recently, a Head-Mounted Display (HMD) has been developed. The HMD is a display device that a user wears in the form of glasses or a helmet, thereby implementing Virtual Reality (VR) or Augmented Reality (AR), in which a focus is formed at a distance close to eyes. A high resolution panel is applied to the HMD, and accordingly, a pixel applicable to the high resolution panel is required.

SUMMARY

Embodiments provide a pixel capable of being applied to a high resolution panel and a display device having the pixel.

In accordance with an aspect of the present disclosure, there is provided a display device including a first sub-pixel including a first sub-pixel circuit, and a first light-emitting element configured to emit light based on a first data signal, a second sub-pixel including a second sub-pixel circuit, and a second light-emitting element configured to emit light based on a second data signal, and a third sub-pixel including a third sub-pixel circuit, and a third light-emitting element configured to emit light based on a third data signal, wherein channels of transistors configured to perform a same function among transistors in the first, second, and third sub-pixel circuits are adjacent to each other.

The first sub-pixel circuit may include a (1_1)th transistor configured to generate a driving current based on the first data signal, and a (2_1)th transistor configured to provide the first data signal to the (1_1)th transistor in response to a first gate signal provided to a first sub-gate line, wherein the second sub-pixel circuit includes a (1_2)th transistor configured to generate a driving current based on the second data signal, and a (2_2)th transistor configured to provide the second data signal to the (1_2)th transistor in response to the first gate signal, wherein the third sub-pixel circuit includes a (1_3)th transistor configured to generate a driving current based on the third data signal, and a (2_3)th transistor configured to provide the third data signal to the (1_3)th transistor in response to the first gate signal, wherein a channel of the (1_1)th transistor, a channel of the (1_2)th transistor, and a channel of the (1_3)th transistor are adjacent to each other, and wherein a channel of the (2_1)th transistor, a channel of the (2_2)th transistor, and a channel of the (2_3)th transistor are adjacent to each other.

A distance between the channel of the (1_1)th transistor and the channel of the (2_1)th transistor may be greater than a distance between the channel of the (1_1)th transistor and the channel of the (1_2)th transistor in plan view.

The channel of the (1_1)th transistor, the channel of the (1_2)th transistor, and the channel of the (1_3)th transistor may be in a first channel area, and wherein 1 the channel of the (2_1)th transistor, the channel of the (2_2)th transistor, and the channel of the (2_3)th transistor are in a second channel area.

A (1_1)th gate electrode, a (1_2)th gate electrode, and a (1_3)th gate electrode may be in the first channel area, wherein one gate electrode is in a channel area including a transistor that is other than transistors configured to generate a driving current.

One second gate electrode may be in the second channel area.

The second gate electrode may overlap the channel of the (2_1)th transistor, the channel of the (2_2)th transistor, and the channel of the (2_3)th transistor in plan view.

Some of channels in a pixel may be arranged along a first direction, and others of the channels in the pixel may be arranged along a second direction perpendicular to the first direction.

The (1_1)th transistor may be connected between a power node configured to provide a power voltage and a (1_1)th node, wherein the (1_2)th transistor is connected between the power node and a (1_2)th node, wherein the (1_3)th transistor is connected between the power node and a (1_3)th node, wherein the first sub-pixel circuit further includes a (3_1)th transistor connected between the (1_1)th gate electrode of the (1_1)th transistor and the (1_1)th node, the (3_1)th transistor configured to operate in response to a second gate signal provided to a second sub-gate line, wherein the second sub-pixel circuit further includes a (3_2)th transistor connected between the (1_2)th gate electrode of the (1_2)th transistor and the (1_2)th node, the (3_2)th transistor configured to operate in response to the second gate signal, and wherein the third sub-pixel circuit further includes a (3_3)th transistor connected between the (1_3)th gate electrode of the (1_3)th transistor and the (1_3)th node, the (3_3)th transistor configured to operate in response to the second gate signal.

A channel of the (3_1)th transistor may not be between the channel of the (1_1)th transistor and the channel of the (1_2)th transistor.

A channel of the (3_1)th transistor, a channel of the (3_2)th transistor, and a channel of the (3_3)th transistor may be in a third channel area, wherein the channels in the third channel area are arranged along the first direction, and wherein the channels in the first channel area are arranged along the second direction.

One third gate electrode may be in the third channel area.

The third gate electrode may overlap the channel of the (3_1)th transistor, the channel of the (3_2)th transistor, and the channel of the (3_3)th transistor in plan view.

The first sub-pixel circuit may further include a (4_1)th transistor connected between the (1_1)th node and an anode electrode of the first light-emitting element, the (4_1)th transistor configured to operate in response to a third gate signal provided to a sub-emission control line, wherein the second sub-pixel circuit further includes a (4_2)th transistor connected between the (1_2)th node and an anode electrode of the second light-emitting element, the (4_2)th transistor configured to operate in response to the third gate signal, and wherein the third sub-pixel circuit further includes a (4_3)th transistor connected between the (1_3)th node and an anode electrode of the third light-emitting element, the (4_3)th transistor configured to operate in response to the third gate signal.

A channel of the (4_1)th transistor, a channel of the (4_2)th transistor, and a channel of the (4_3)th transistor may be in a fourth channel area, wherein the third channel area contacts the fourth channel area.

One fourth gate electrode may be in the fourth channel area, wherein the fourth gate electrode overlaps the channel of the (4_1)th transistor, the channel of the (4_2)th transistor, and the channel of the (4_3)th transistor in plan view.

The display device may further include a third electrode layer constituting the first and second sub-gate lines and the sub-emission control line, a fourth electrode layer constituting a first data line configured to provide the first data signal, a second data line configured to provide the second data signal, and a third data line configured to provide the third data signal, and via holes through which the fourth electrode layer is connected to the third electrode layer.

One of the via holes connected to the anode electrode of the second light-emitting element and the (4_1)th transistor may overlap in plan view.

The first sub-pixel circuit may further include a (5_1)th transistor connected between the anode electrode of the first light-emitting element and an initialization voltage node configured to receive an initialization voltage, wherein the second sub-pixel circuit further includes a (5_2)th transistor connected between the anode electrode of the second light-emitting element and the initialization voltage node, and wherein the third sub-pixel circuit further includes a (5_3)th transistor connected between the anode electrode of the third light-emitting element and the initialization voltage node.

A channel of the (5_1)th transistor, a channel of the (5_2)th transistor, and a channel of the (5_3)th transistor may be in a fifth channel area, and wherein a distance between the third channel area and the fifth channel area is greater than a distance between the third channel area and the first channel area.

In accordance with an aspect of the present disclosure, there is provided an electronic device including a display device including a first sub-pixel including a first sub-pixel circuit, and a first light-emitting element configured to emit light based on a first data signal, a second sub-pixel including a second sub-pixel circuit, and a second light-emitting element configured to emit light based on a second data signal, and a third sub-pixel including a third sub-pixel circuit, and a third light-emitting element configured to emit light based on a third data signal, wherein channels of transistors configured to perform a same function among transistors in the first, second, and third sub-pixel circuits are adjacent to each other.

The electronic device may include a smartphone, a television, a monitor, a tablet, an electric vehicle, a mobile phone, a tablet personal computer (PC), a mobile communication terminal, an electronic notebook, an electronic book, a portable multimedia player (PMP), a navigation device, an ultra-mobile PC (UMPC), a laptop computer, a billboard, an Internet of Things (IoT) device, a smartwatch, a watch phone, or a head-mounted display (HMD).

BRIEF DESCRIPTION OF THE DRAWINGS

Embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
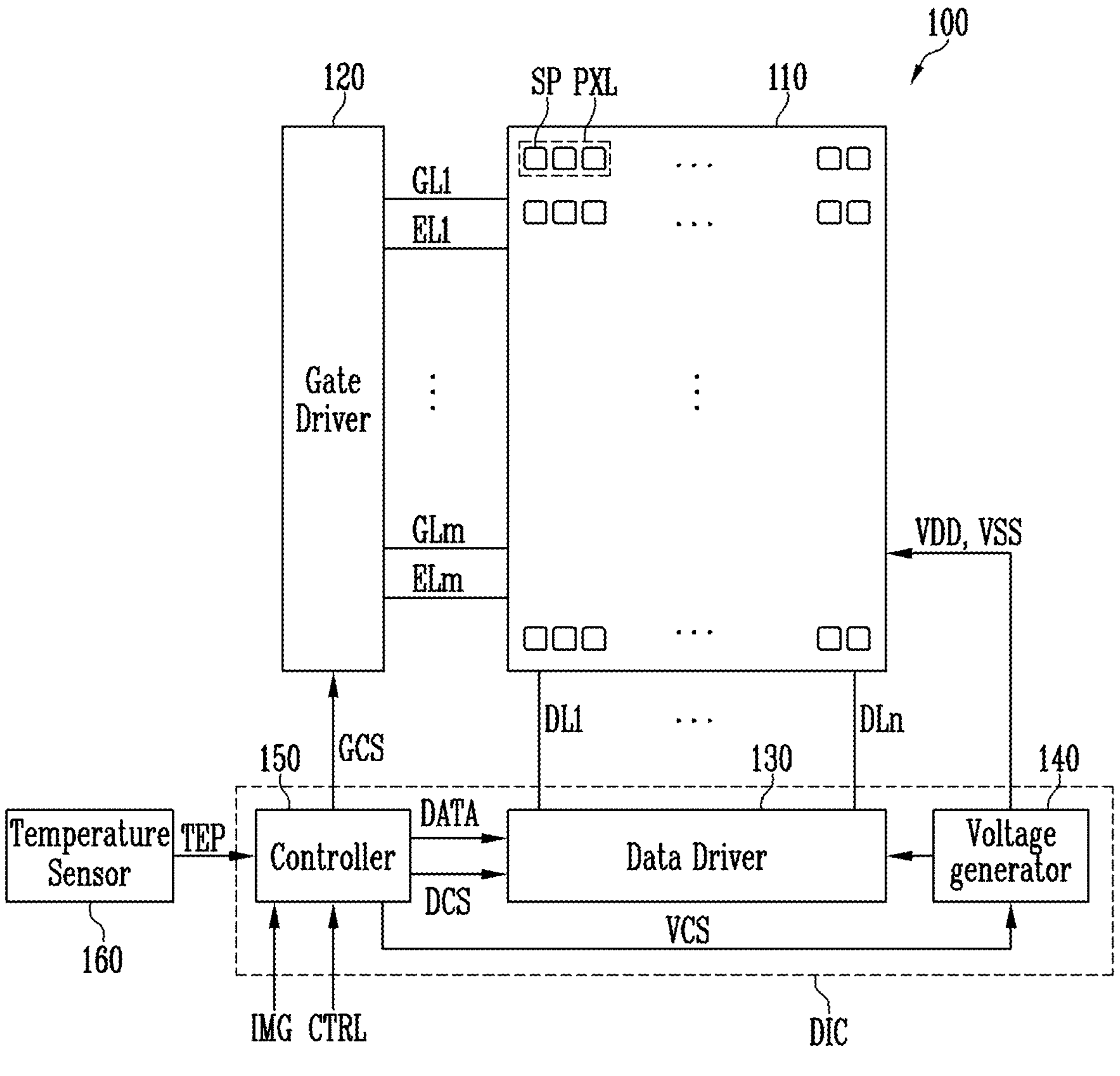
FIG. 1 is a block diagram illustrating one or more embodiments of a display device.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing one or more embodiments corresponds to one or more embodiments of the present disclosure.

A person of ordinary skill in the art would appreciate, in view of the present disclosure in its entirety, that each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner unless otherwise stated or implied.

In the drawings, the relative sizes of elements, layers, and regions may be exaggerated for clarity and/or descriptive purposes. In other words, because the sizes and thicknesses of elements in the drawings are arbitrarily illustrated for convenience of description, the disclosure is not limited thereto. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result of, for example, manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the illustrated shapes of elements, layers, or regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place.

Spatially relative terms, such as “beneath,” “below,” “lower,” “lower side,” “under,” “above,” “upper,” “over,” “higher,” “upper side,” “side” (e.g., as in “sidewall”), and the like, may be used herein for ease of explanation to describe one element or feature’s relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as “below,” “beneath,” “or “under” other elements or features would then be oriented “above” the other elements or features. Thus, the example terms “below” and “under” can encompass both an orientation of above and below. The device may be otherwise oriented (e.g., rotated 90 degrees or at other orientations) and the spatially relative descriptors used herein should be interpreted accordingly. Similarly, when a first part is described as being arranged “on” a second part, this indicates that the first part is arranged at an upper side or a lower side of the second part without the limitation to the upper side thereof on the basis of the gravity direction.

Further, the phrase “in a plan view” means when an object portion is viewed from above, and the phrase “in a schematic cross-sectional view” means when a schematic cross-section taken by vertically cutting an object portion is viewed from the side. The terms “overlap” or “overlapped” mean that a first object may be above or below or to a side of a second object, and vice versa. Additionally, the term “overlap” may include stack, face or facing, extending over, covering, or partly covering or any other suitable term as would be appreciated and understood by those of ordinary skill in the art. The expression “not overlap” may include meaning, such as “apart from” or “set aside from” or “offset from” and any other suitable equivalents as would be appreciated and understood by those of ordinary skill in the art. The terms “face” and “facing” may mean that a first object may directly or indirectly oppose a second object. In a case in which a third object intervenes between first and second objects, the first and second objects may be understood as being indirectly opposed to one another, although still facing each other.

It will be understood that when an element, layer, region, or component (e.g., an apparatus, a device, a circuit, a wire, an electrode, a terminal, a conductive film, etc.) is referred to as being “formed on,” “on,” “connected to,” or “(operatively, functionally, or communicatively) coupled to” another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being “electrically connected” or “electrically coupled” to another layer, region, or component, it can be directly electrically connected or coupled to the other layer, region, and/or component or one or more intervening layers, regions, or components may be present. The one or more intervening components may include a switch, a transistor, a resistor, an inductor, a capacitor, a diode and/or the like. Accordingly, a connection is not limited to the connections illustrated in the drawings or the detailed description and may also include other types of connections. In describing embodiments, an expression of connection indicates electrical connection unless explicitly described to be direct connection, and “directly connected/directly coupled,” or “directly on,” refers to one component directly connecting or coupling another component, or being on another component, without an intermediate component.

In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed “under” another portion, this includes not only a case where the portion is “directly beneath” the another portion but also a case where there is further another portion between the portion and the another portion. Meanwhile, other expressions describing relationships between components, such as “between,” “immediately between” or “adjacent to” and “directly adjacent to,” may be construed similarly. It will be understood that when an element or layer is referred to as being “between” two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XY, YZ, and XZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions such as "at least one of," "a plurality of," "one of," and other prepositional phrases, when preceding a list of elements, modify the entire list of elements and do not modify the individual elements of the list. When "C to D" is stated, it means C or more and D or less, unless otherwise specified.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are used only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions DR1, DR2 and/or DR3.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the terms "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5% of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure." Furthermore, the expression "being the same" may mean "being substantially the same". In other words, the expression "being the same" may include a range that can be tolerated by those of ordinary skill in the art. The other expressions may also be expressions from which "substantially" has been omitted.

In some embodiments well-known structures and devices may be described in the accompanying drawings in relation to one or more functional blocks (e.g., block diagrams), units, and/or modules to avoid unnecessarily obscuring various embodiments. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram illustrating one or more embodiments of a display device.

Referring to FIG. 1, the display device 100 may include a display panel 110, a gate driver 120, a data driver 130, a voltage generator 140, and a controller 150.

The display panel 110 may include sub-pixels SP. The sub-pixels SP may be connected to the gate driver 120 through first to mth gate lines GL1 to GLm. The sub-pixels SP may be connected to the data driver 130 through first to nth data lines DL1 to DLn.

Each of the sub-pixels SP may include at least one light-emitting element configured to generate light. Accordingly, each of the sub-pixels SP may generate light of a corresponding color, such as red, green, blue, cyan, magenta or yellow. Two or more sub-pixels SP among the sub-pixels SP may constitute one pixel PXL. For example, three sub-pixels SP may constitute one pixel PXL as shown in FIG. 1.

The gate driver 120 may be connected to the sub-pixels SP arranged in a row direction through the first to mth gate lines GL1 to GLm. The gate driver 120 may output gate signals to the first to mth gate lines GL1 to GLm in response to a gate control signal GCS. In embodiments, the gate control signal GCS may include a start signal indicating a start of each frame, a horizontal synchronization signal for outputting gate signals in synchronization with timings at which data signals are applied, and the like.

In embodiments, first to mth emission control lines EL1 to ELm connected to the sub-pixels SP arranged in the row direction may be further provided. The gate driver 120 may include an emission control driver configured to control the first to mth emission control lines EL1 to ELm, and the emission control driver may operate under the control of the controller 150.

The gate driver 120 may be located at one side of the display panel 110. However, embodiments are not limited thereto. For example, the gate driver 120 may be divided into two or more drivers that are physically and/or logically divided, and these drivers may be located at one side of the display panel 110 and the other side of the display panel 110, which is opposite to the one side. As such, in some embodiments, the gate driver 120 may be located in various forms at the periphery of the display panel 110.

The data driver 130 may be connected to the sub-pixels SP arranged in a column direction through the first to nth data lines DL1 to DLn. The data driver 130 may receive image data DATA and a data control signal DCS from the controller 150. The data driver 130 may operate in response to the data control signal DCS. In embodiments, the data control signal DCS may include a source start pulse, a source shift clock, a source output enable signal, and the like.

The data driver 130 may apply data signals having grayscale voltages corresponding to the image data DATA to the first to nth data lines DL1 to DLn by using voltages from the voltage generator 140. When a gate signal is applied to each of the first to mth gate lines GL1 to GLm, data signals corresponding to the image data DATA may be applied to the data lines DL1 to DLn. Accordingly, corresponding sub-pixels SP may generate light corresponding to the data signals. Accordingly, an image may be displayed on the display panel 110.

In embodiments, the gate driver 120 and the data driver 130 may include complementary metal-oxide semiconductor (CMOS) circuit elements.

The voltage generator 140 may operate in response to a voltage control signal VCS from the controller 150. The voltage generator 140 may be configured to generate a plurality of voltages and provide the generated voltages to components of the display device 100. For example, the voltage generator 140 may be configured to generate a plurality of voltages by receiving an input voltage from an outside of the display device 100, adjusting the received voltage, and regulating the adjusted voltage.

The voltage generator 140 may generate a first power voltage VDD and a second power voltage VSS, and the generated first and second power voltages VDD and VSS may be provided to the sub-pixels SP. The first power voltage VDD may have a relatively high voltage level, and the second power voltage VSS may have a voltage level lower than the voltage level of the first power voltage VDD. In other embodiments, the first power voltage VDD or the second power voltage VSS may be provided by an external device of the display device 100.

Besides, the voltage generator 140 may generate various voltages. For example, the voltage generator 140 may generate an initialization voltage applied to the sub-pixels SP. For example, a reference voltage (e.g., a predetermined reference voltage) may be applied to the first to nth data lines DL1 to DLn in a sensing operation for sensing electrical characteristics of transistors and/or light-emitting elements of the sub-pixels SP, and the voltage generator 140 may generate the reference voltage.

The controller 150 may control overall operations of the display device 100. The controller 150 may receive, from the outside, input image data IMG and a control signal CTRL for controlling display thereof. The controller 150 may provide the gate control signal GCS, the data control signal DCS, and the voltage control signal VCS in response to the control signal CTRL.

The controller 150 may convert the input image data IMG to be suitable for the display device 100 or the display panel 110, thereby outputting the image data DATA. In embodiments, the controller 150 may align the input image data IMG to be suitable for the sub-pixels SP in units of rows, thereby outputting the image data DATA.

Two or more components among the data driver 130, the voltage generator 140, and the controller 150 may be mounted on one integrated circuit. As shown in FIG. 1, the data driver 130, the voltage generator 140, and the controller 150 may be included in a driver integrated circuit DIC. The data driver 130, the voltage generator 140, and the controller 150 may be components functionally divided in one driver integrated circuit DIC. In other embodiments, at least one of the data driver 130, the voltage generator 140, and the controller 150 may be provided as a component distinguished from the driver integrated circuit DIC.

The display device 100 may include at least one temperature sensor 160. The temperature sensor 160 may be configured to sense a temperature at the periphery thereof and generate temperature data TEP indicating the sensed temperature. In embodiments, the temperature sensor 160 may be adjacent to the display panel 110 and/or the driver integrated circuit DIC.

The controller 150 may control various operations of the display device 100 in response to the temperature data TEP. In embodiments, the controller 150 may adjust the luminance of an image output from the display panel 110 in response to the temperature data TEP. For example, the controller 150 may control components, such as the data driver 130 and/or the voltage generator 140, thereby adjusting data signals and the first and second power voltages VDD and VSS.

The display device 100 according to one or more embodiments is a device that displays a moving image and/or a still image. The display device 100 may be applied to portable electronic devices such as mobile phones, smartphones, tablet personal computers (PCs), mobile communication terminals, electronic notebooks, electronic books, portable multimedia players (PMPs), navigations, and ultra-mobile PCs (UMPCs). For example, the display device 100 may be applied to a display unit of a television, a tablet, an electric vehicle, a laptop computer, a monitor, a billboard, or the Internet of Things (IoT) device. Alternatively, in one or more embodiments, the display device 100 may be applied to a smartwatch, a watch phone, and/or a head-mounted display (HMD) for implementing virtual reality and/or augmented reality.

Figure 2:
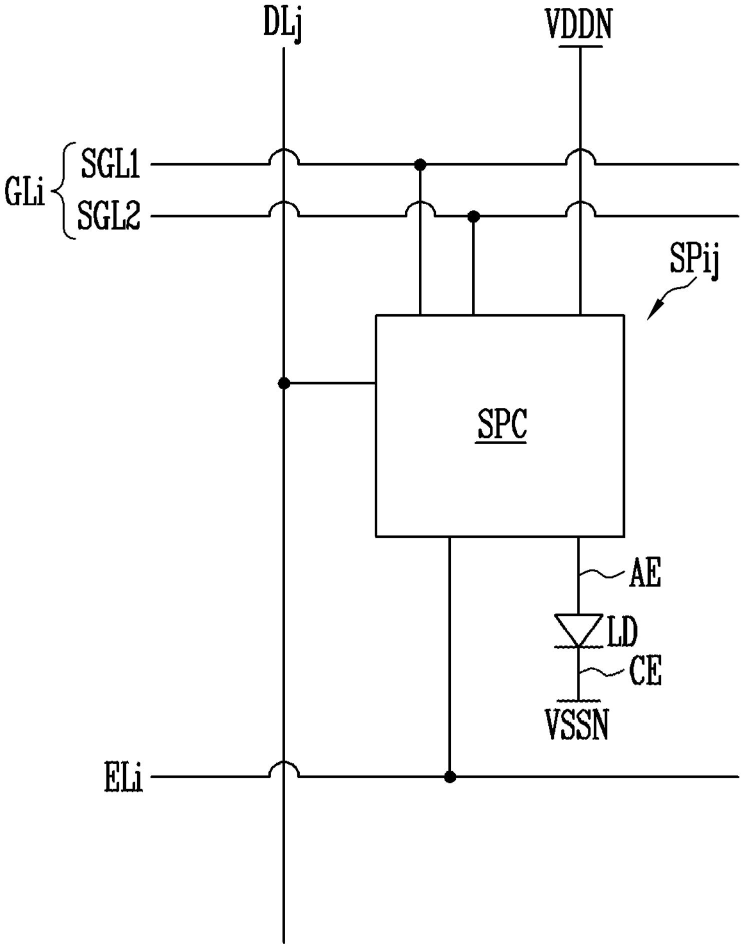
FIG. 2 is a block diagram illustrating one or more embodiments of any one of sub-pixels shown in FIG. 1.

FIG. 2 is a block diagram illustrating one or more embodiments of any one of the sub-pixels shown in FIG. 1. In FIG. 2, a sub-pixel SPij arranged on an ith row (i is an integer greater than or equal to 1 and smaller than or equal to m) and a jth column (j is an integer greater than or equal to 1 and smaller than or equal to n) among the sub-pixels SP shown in FIG. 1 is illustrated.

Referring to FIG. 2, the sub-pixel SPij may include a sub-pixel circuit SPC and a light-emitting element LD.

The light-emitting element LD may be connected between a first power voltage node VDDN and a second power voltage node VSSN. The first power voltage node VDDN may be a node transferring the first power voltage VDD shown in FIG. 1, and the second power voltage node VSSN may be a node transferring the second power voltage VSS shown in FIG. 1.

An anode electrode AE of the light-emitting element LD may be connected to the first power voltage node VDDN through the sub-pixel circuit SPC, and a cathode electrode CE of the light-emitting element LD may be connected to the second power voltage node VSSN. For example, the anode electrode AE of the light-emitting element LD may be connected to the first power voltage node VDDN through one or more transistors included in the sub-pixel circuit SPC.

The sub-pixel circuit SPC may be connected to an ith gate line GLi among the first to mth gate lines GL1 to GLm shown in FIG. 1, an ith emission control line ELi among the first to mth emission control lines EL1 to ELm shown in FIG. 1, and a jth data line DLj among the first to nth data lines DL1 to DLn shown in FIG. 1. The sub-pixel circuit SPC may be configured to control the light-emitting element LD according to signals received through these signal lines.

The sub-pixel circuit SPC may operate in response to a gate signal received through the ith gate line GLi. The ith gate line GLi may include one or more sub-gate lines. In embodiments, as shown in FIG. 2, the ith gate line GLi may include first and second sub-gate lines SGL1 and SGL2. The sub-pixel circuit SPC may operate in response to gate signals received through the first and second sub-gate lines SGL1 and SGL2. As such, when the ith gate line GLi includes two or more sub-gate lines, the sub-pixel circuit SPC may operate in response to gate signals received through the corresponding sub-gate lines.

The sub-pixel circuit SPC may operate in response to an emission control signal received through the ith emission control line ELi. In embodiments, the ith emission control line ELi may include one or more sub-emission control lines. When the ith emission control line ELi includes two or more sub-emission control lines, the sub-pixel circuit SPC may operate in response to emission control signals receives through the corresponding emission control lines.

The sub-pixel circuit SPC may receive a data signal through the jth data line DLj. The sub-pixel circuit SPC may store a voltage corresponding to the data signal in response to at least one of the gate signals received through the first and second sub-gate lines SGL1 and SGL2. The sub-pixel circuit SPC may control a current flowing from the first power voltage node VDDN to the second power voltage node VSSN through the light-emitting element LD according to the stored voltage in response to the emission control signal received through the ith emission control line ELi. Accordingly, the light-emitting element LD may generate light with a luminance corresponding to the data signal.

Figure 3:
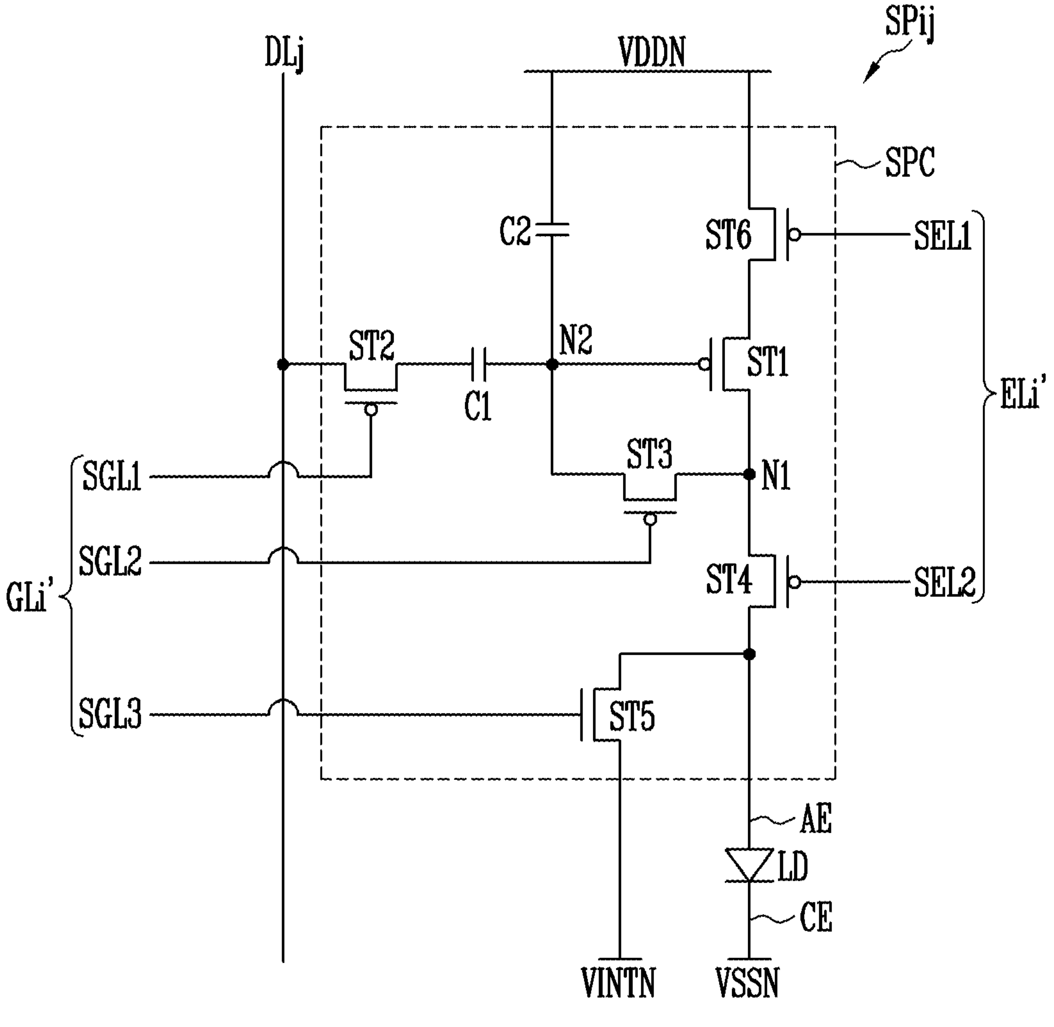
FIG. 3 is a circuit diagram illustrating one or more embodiments of the sub-pixel shown in FIG. 2.

FIG. 3 is a circuit diagram illustrating one or more embodiments of the sub-pixel shown in FIG. 2.

Referring to FIG. 3, a sub-pixel SPij may include a sub-pixel circuit SPC and a light-emitting element LD.

The sub-pixel circuit SPC may be connected to an ith gate line GLi', an ith emission control line ELi', and a jth data line DLj. When comparing the ith gate line GLi' with the ith gate line GLi shown in FIG. 2, the ith gate line GLi' may further include a third sub-gate line SGL3. When comparing the ith emission control line ELi' with the ith emission control line ELi shown in FIG. 2, the ith emission control line ELi' may include a first sub-emission control line SEL1 and a second sub-emission control line SEL2 (e.g., a sub-emission control line in the claims).

The sub-pixel circuit SPC may include first to sixth transistors ST1 to ST6 and first and second capacitors C1 and C2.

The first transistor ST1 may be connected between a first power voltage node VDDN and a first node N1. A gate of the first transistor ST1 may be connected to a second node N2, and accordingly, the first transistor ST1 may be turned on according to a voltage level of the second node N2. The first transistor ST1 may be designated as a driving transistor.

The second transistor ST2 may be connected between the jth data line DLj and the second node N2. A gate of the second transistor ST2 may be connected to a first sub-gate line SGL1, and accordingly, the second transistor ST2 may be turned on in response to a gate signal (e.g., a first gate signal in the claims) of the first sub-gate line SGL1. The second transistor ST2 may be designated as a switching transistor.

The third transistor ST3 may be connected between the first node N1 and the second node N2. A gate of the third transistor ST3 may be connected to a second sub-gate line SGL2, and accordingly, the third transistor ST3 may be turned on in response to a gate signal (e.g., a second gate signal in the claims) of the second sub-gate line SGL2.

The fourth transistor ST4 may be connected between the first node N1 and an anode electrode AE of the light-emitting element LD. A gate of the fourth transistor ST4 may be connected to the second sub-emission control line SEL2, and accordingly, the fourth transistor ST4 may be turned on in response to an emission control signal (e.g., a third gate signal in the claims) of the second sub-emission control line SEL2.

The fifth transistor ST5 may be connected between the anode electrode AE of the light-emitting element LD and an initialization voltage node VINTN. The initialization voltage node VINTN may be configured to transfer an initialization voltage. In embodiments, the initialization voltage may be provided by the voltage generator 140 shown in FIG. 1. In other embodiments, the initialization voltage may be provided by an external device of the display device 100. A gate of the fifth transistor ST5 may be connected to the third sub-gate line SGL3, and accordingly, the fifth transistor ST5 may be turned on in response to a gate signal of the third sub-gate line SGL3.

The sixth transistor ST6 may be connected between the first power voltage node VDDN and the first transistor ST1. A gate of the sixth transistor ST6 may be connected to the first sub-emission control line SEL1, and accordingly, the sixth transistor ST6 may be turned on in response to an emission control signal of the first sub-emission control line SEL1.

The first capacitor C1 may be connected between the second transistor ST2 and the second node N2. The second capacitor C2 may be connected between the first power voltage node VDDN and the second node N2.

As such, the sub-pixel circuit SPC may include the first to sixth transistors ST1 to ST6 and the first and second capacitors C1 and C2. However, embodiments are not limited thereto. The sub-pixel circuit SPC may be implemented as any one of various types of circuits each including a plurality of transistors and one or more capacitors. For example, the sub-pixel circuit SPC may include two transistors and one capacitor. In accordance with embodiments of the sub-pixel circuit SPC, the number of sub-gate lines included in the ith gate line GLi' and the number of sub-emission control lines included in the ith emission control line ELi' may vary.

The first to fourth transistors ST1 to ST4 and the sixth transistor ST6 may be P-type transistors. The fifth transistor ST5 may be an N-type transistor. Each of the first to sixth transistors ST1 to ST6 may be a Metal Oxide Silicon Field Effect Transistor (MOSFET). However, embodiments are not limited thereto.

In embodiments, the first to sixth transistors ST1 to ST6 may include an amorphous silicon semiconductor, a monocrystalline silicon semiconductor, a polycrystalline silicon semiconductor, an oxide semiconductor, and the like.

The light-emitting element LD may include the anode electrode AE, a cathode electrode CE, and a light-emitting layer. The light-emitting layer may be located between the anode electrode AE and the cathode electrode CE. After a data signal transferred through the jth data line DLj is reflected on a voltage of the second node N2, the fourth and sixth transistors ST4 and ST6 may be turned on when the emission control signals of the first and second sub-emission control lines SEL1 and SEL2 are enabled to a low level. The first transistor ST1 may be turned on according to the voltage of the second node N2, and accordingly, a current may flow from the first power voltage node VDDN to a second power voltage node VSSN. The light-emitting element LD may emit light according to an amount of the current flowing from the first power voltage node VDDN to the second power voltage node VSSN.

Figure 4:
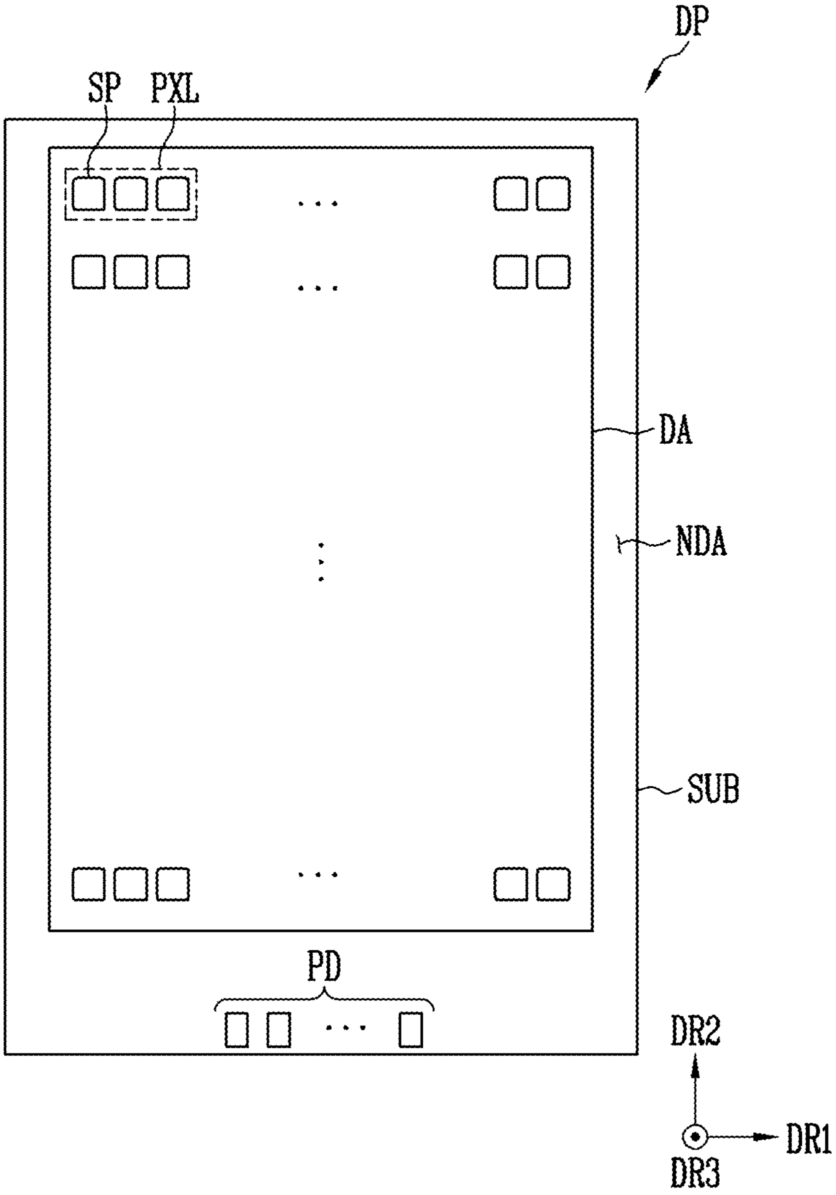
FIG. 4 is a plan view illustrating one or more embodiments of a display panel shown in FIG. 1.

FIG. 4 is a plan view illustrating one or more embodiments of the display panel shown in FIG. 1.

Referring to FIG. 4, one or more embodiments (a display panel DP) of the display panel 110 shown in FIG. 1 may include a display area DA and a non-display area NDA. The display panel DP may display an image through the display area DA. The non-display area NDA may be located at the periphery of the display area DA.

The display panel DP may include a substrate SUB, sub-pixels SP, and pads PD.

When the display panel DP is used as a display screen of a Head-Mounted Display (HMD), a Virtual Reality (VR) device, a Mixed Reality (MR) device, an Augmented Reality (AR) device, and the like, the display panel DP may be located relatively very close to eyes of a user. The sub-pixels SP having a relatively high degree of integration may be required. To increase the degree of integration of the sub-pixels SP, the substrate SUB may be provided as a silicon substrate. The sub-pixels SP may be formed on the substrate SUB as the silicon substrate. The display device 100 (see FIG. 1) including the display panel DP having the sub-pixels SP formed on the substrate SUB as the silicon substrate may be designated as an OLED on Silicon (OLEDoS) display device.

The sub-pixels SP may be located in the display area DA on the substrate SUB. The sub-pixels SP may be arranged in a matrix form along a first direction DR1 and a second direction DR2 crossing the first direction DR1. However, embodiments are not limited thereto. For example, the sub-pixels SP may be arranged in a zigzag form along the first direction DR1 and the second direction DR2. For example, the sub-pixels SP may be located in a PENTILE™ form (PENTILE™ being a registered trademark of Samsung Display Co., Ltd., Republic of Korea). The first direction DR1 may be a row direction, and the second direction DR2 may be a column direction.

Two or more sub-pixels SP among the sub-pixels SP may constitute one pixel PXL.

A component for controlling the sub-pixels SP may be located in the non-display area NDA on the substrate SUB. For example, lines connected to the sub-pixels SP, such as the first to mth gate lines GL1 to GLm and the first to nth data lines DL1 to DLn, which are shown in FIG. 1, may be located in the non-display area NDA.

At least one of the gate driver 120, the data driver 130, the voltage generator 140, the controller 150, and the temperature sensor 160, which are shown in FIG. 1, may be integrated in the non-display area NDA of the display panel DP. In embodiments, the gate driver 120 shown in FIG. 1 is mounted on the display panel DP, and may be located in the non-display area NDA. In other embodiments, the gate driver 120 may be implemented as an integrated circuit distinguished from the display panel DP. In embodiments, the temperature sensor 160 may be located in the non-display area NDA to sense a temperature of the display panel DP.

The pads PD may be located in the non-display area NDA on the substrate SUB. The pads PD may be electrically connected to the sub-pixels SP through the lines. For example, the pads PD may be connected to the sub-pixels SP through the first to nth data lines DL1 to DLn.

The pads PD may interface the display panel DP with other components of the display device 100 (see FIG. 1). In embodiments, voltages and signals, which are suitable for operations of components included in the display panel DP, may be provided from the driver integrated circuit DIC shown in FIG. 1 through the pads PD. For example, the first to nth data lines DL1 to DLn may be connected to the driver integrated circuit DIC through the pads PD. For example, the first and second power voltages VDD and VSS may be received from the driver integrated circuit DIC through the pads PD. When the gate driver 120 is mounted in the display panel DP, the gate control signal GCS may be transmitted from the driver integrated circuit DIC to the gate driver 120 through the pads PD.

In embodiments, a circuit board may be electrically connected to the pads PD, using a conductive adhesive member, such as an anisotropic conductive film. The circuit board may be a Flexible Printed Circuit Board (FPCB) or a flexible film, which has a flexible material. The driver integrated circuit DIC may be mounted on the circuit board to be electrically connected to the pads PD.

In embodiments, the display area DA may have various shapes. The display area DA may have a closed-loop shape including linear sides and/or curved sides. For example, the display area DA may have shapes, such as a polygon, a circle, a semicircle, and an ellipse.

In embodiments, the display panel DP may have a flat display surface. In other embodiments, the display panel DP may at least partially have a round display surface. In embodiments, the display panel DP may be bendable, foldable or rollable. The display panel DP and/or the substrate SUB may include materials having flexibility.

Figure 5:
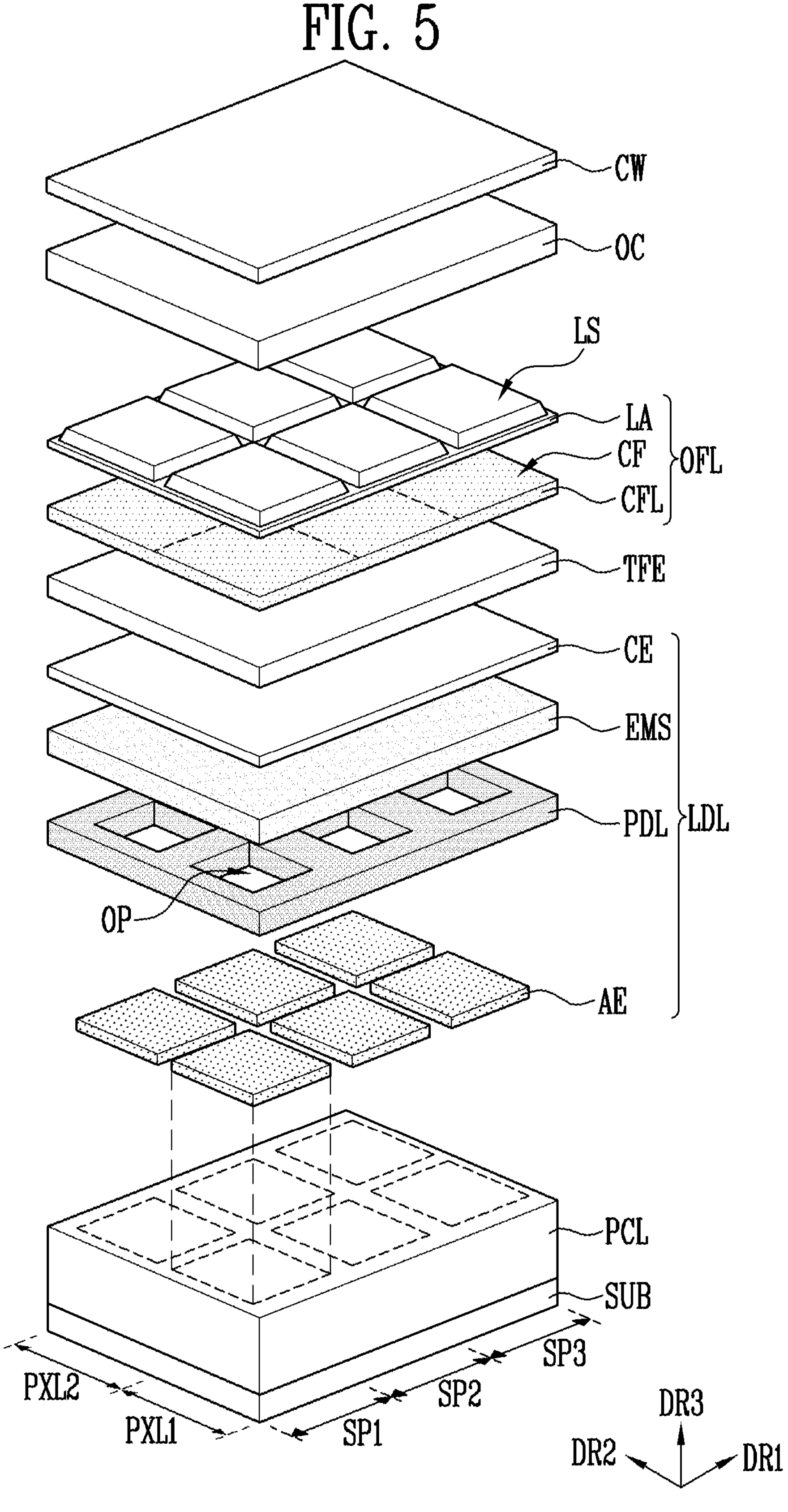
FIG. 5 is an exploded perspective view illustrating a portion of the display panel shown in FIG. 4.

FIG. 5 is an exploded perspective view illustrating a portion of the display panel shown in FIG. 4. In FIG. 5, for clear and brief description, a portion of the display panel DP, which corresponds to two pixels PXL1 and PXL2 among the pixels PXL shown in FIG. 4, may be schematically illustrated. A portion of the display panel DP, which corresponds to the other pixels, may also be configured identically.

Referring to FIGS. 4 and 5, each of first and second pixels PXL1 and PXL2 may include first to third sub-pixels SP1, SP2, and SP3. However, embodiments are not limited thereto. For example, each of the first and second pixels PXL1 and PXL2 may include four sub-pixels or include two sub-pixels.

In FIG. 5, it may be illustrated that the first to third sub-pixels SP1, SP2, and SP3 may have quadrangular shapes when viewed in a third direction DR3 crossing the first and second directions DR1 and DR2, and may have the same size. However, embodiments are not limited thereto. The first to third sub-pixels SP1, SP2, and SP3 may be modified to have various shapes.

The display panel DP may include a substrate SUB, a pixel circuit layer PCL, a light-emitting element layer LDL, an encapsulation layer TFE, an optical functional layer OFL, an overcoat layer OC, and a cover window CW.

In embodiments, the substrate SUB may include a silicon wafer substrate formed using a semiconductor process. The substrate SUB may include a semiconductor material suitable for forming circuit elements. For example, the semiconductor material may include silicon, germanium, and/or silicon-germanium. The substrate SUB may be provided from a bulk wafer, an epitaxial layer, a Silicon-On-Insulator (SOI) layer, a Semiconductor-On-Insulator (SeOI) layer, or the like. In other embodiments, the substrate SUB may include a glass substrate. In still other embodiments, the substrate SUB may include a polyimide (PI) substrate.

The pixel circuit layer PCL may be located on the substrate SUB. The substrate SUB and/or the pixel circuit layer PCL may include insulating layers and conductive patterns located between the insulating layers. The conductive patterns of the pixel circuit layer PCL may serve as at least some of circuit elements, lines, and the like. The conductive patterns may include copper, but embodiments are not limited thereto.

The circuit elements may include a sub-pixel circuit SPC (see FIG. 2) of each of the first to third sub-pixels SP1, SP2, and SP3. The sub-pixel circuit SPC may include transistors and one or more capacitors. Each transistor may include a semiconductor portion including a source region, a drain region, and a channel region, and a gate electrode overlapping with the semiconductor portion. In embodiments, when the substrate SUB is provided as a silicon substrate, the semiconductor portion may be included in the substrate SUB, and the gate electrode may be included as a conductive pattern of the pixel circuit layer PCL in the pixel circuit layer PCL.

In embodiments, when the substrate SUB is provided as a glass substrate or a PI substrate, the semiconductor portion and the gate electrode may be included in the pixel circuit layer PCL. Each capacitor may include electrodes spaced apart from each other. For example, each capacitor may include electrodes spaced apart from each other on a plane defined by the first and second directions DR1 and DR2. For example, the capacitor may include electrodes spaced apart from each other in the third direction DR3 with an insulating layer interposed therebetween.

The lines of the pixel circuit layer PCL may include signal lines (e.g., a gate line, an emission control line, a data line, and the like), which are connected to each of the first to third sub-pixels SP1, SP2, and SP3. The lines may further include a line connected to the first power voltage node VDDN shown in FIG. 2. Also, the lines may further include a line connected to the second power voltage node VSSN shown in FIG. 2.

The light-emitting element layer LDL may include anode electrodes AE, a pixel-defining layer PDL, a light-emitting structure EMS, and a cathode electrode CE.

The anode electrodes AE may be located on the pixel circuit layer PCL. The anode electrodes AE may be in contact with the circuit elements of the pixel circuit layer PCL. The anode electrodes AE may include an opaque conductive material capable of reflecting light, but embodiments are not limited thereto.

The pixel-defining layer PDL may be located over the anode electrodes AE. The pixel-defining layer PDL may include an opening OP exposing a portion of each of the anode electrodes AE. Emission areas respectively corresponding to the first to third sub-pixels SP1 to SP3 may be defined according to the openings OP of the pixel-defining layer PDL. Alternatively, it may be understood that emission areas respectively corresponding to the first to third sub-pixels SP1 to SP3 are defined according to the anode electrodes AE. In an area adjacent to a boundary between sub-pixels adjacent to each other, the pixel-defining layer PDL may include a separator that causes a discontinuity to be formed in the light-emitting structure EMS. It may be understood that emission areas respectively corresponding to the first to third sub-pixels SP1 to SP3 are defined according to separator of the pixel-defining layer PDL.

In embodiments, the pixel-defining layer PDL may include an inorganic material. The pixel-defining layer PDL may include a plurality of stacked inorganic layers. For example, the pixel-defining layer PDL may include silicon oxide ($SiO_x$) and silicon nitride ($SiN_x$). In other embodiments, the pixel-defining layer PDL may include an organic material. However, the material of the pixel-defining layer PDL is not limited thereto.

The light-emitting structure EMS may be located on the anode electrodes AE exposed by the openings OP of the pixel-defining layer PDL. The light-emitting structure EMS may include a light-emitting layer configured to generate light, an electron transport layer configured to transport electrons, a hole transport layer configured to transport holes, and the like.

In embodiments, the light-emitting structure EMS fills the opening OP of the pixel-defining layer PDL, and may be entirely located on the top of the pixel-defining layer PDL. In other words, the light-emitting structure EMS may extend throughout the first to third sub-pixels SP1 to SP3. At least some of the layers in the light-emitting structure EMS may be cut or bent at boundaries between the first to third sub-pixels SP1 to SP3. However, embodiments are not limited thereto. For example, portions of the light-emitting structure EMS, which correspond to the first to third sub-pixels SP1 to SP3, may be separated from each other, and each of the portions may be located in the opening OP of the pixel-defining layer PDL.

The cathode electrode CE may be located on the light-emitting structure EMS. The cathode electrode CE may extend throughout the first to third sub-pixels SP1 to SP3. As such, the cathode electrode CE may be provided as a common electrode for the first to third sub-pixels SP1 to SP3.

The cathode electrode CE may be a thin metal layer having a thickness to a degree to which light emitted from the light-emitting structure EMS can be transmitted therethrough. The cathode electrode CE may be formed of a metal material to have a relatively thin thickness or be formed of a transparent conductive material. In embodiments, the cathode electrode CE may include at least one of various transparent conductive materials including indium tin oxide, indium zinc oxide, indium tin zinc oxide, aluminum zinc oxide, gallium zinc oxide, zinc tin oxide, and/or gallium tin oxide. In other embodiments, the cathode electrode CE may include at least one of silver (Ag), magnesium (Mg), and mixtures thereof. However, the material of the cathode electrode CE is not limited thereto.

It may be understood that any one of the anode electrodes AE, a portion of the light-emitting structure EMS, which overlaps therewith, and a portion of the cathode electrode CE, which overlaps therewith, constitute one light-emitting element LD (see FIG. 2). In other words, each of light-emitting elements of the first to third sub-pixels SP1, SP2, and SP3 may include one anode electrode AE, a portion of the light-emitting structure EMS, which overlaps therewith, and a portion of the cathode electrode CE, which overlaps therewith. In each of the first to third sub-pixels SP1, SP2, and SP3, holes injected from the anode electrode AE and electrons injected from the cathode electrode CE may be transported into a light-emitting layer of the light-emitting structure EMS to form excitons, and light may be generated when the excitons are changed from an excited state to a ground state. A luminance of the light may be determined according to an amount of current flowing through the light-emitting layer. A wavelength band of the generated light may be determined according to a configuration of the light-emitting layer.

The encapsulation layer TFE may be located over the cathode electrode CE. The encapsulation layer TFE may cover the light-emitting element layer LDL and/or the pixel circuit layer PCL. The encapsulation layer TFE may be configured to reduce or prevent oxygen and/or moisture from infiltrating into the light-emitting element layer LDL. In embodiments, the encapsulation layer TFE may include a structure in which at least one inorganic layer and at least one organic layer are alternately stacked. For example, the inorganic layer may include silicon nitride, silicon oxide, silicon oxynitride ($SiO_xN_y$), or the like. For example, the organic layer may include an organic insulating material, such as acrylic resin, epoxy resin, phenolic resin, polyamide resin, polyimide resin, unsaturated polyester resin, polyphenylene resin, polyphenylenesulfide resin, or benzocyclobutene (BCB). However, the materials of the organic layer and the inorganic layer of the encapsulation layer TFE are not limited thereto.

To improve encapsulation efficiency of the encapsulation layer TFE, the encapsulation layer TFE may further include a thin film including aluminum oxide ($AlO_x$). The thin film including the aluminum oxide may be located on a top surface of the encapsulation layer TFE, which faces the optical functional layer OFL, and/or a bottom surface of the encapsulation layer TFE, which faces the light-emitting element layer LDL.

The thin film including the aluminum oxide may be formed through an Atomic Layer Deposition (ALD) process. However, embodiments are not limited thereto. The encapsulation layer TFE may further include a thin film formed of at least one of various materials suitable for the improvement of the encapsulation efficiency.

The optical functional layer OFL may be located on the encapsulation layer TFE. The optical functional layer OFL may include a color filter layer CFL and a lens array LA.

The color filter layer CFL may be located between the encapsulation layer TFE and the lens array LA. The color filter layer CFL may be configured to filter light emitted from the light-emitting structure EMS, thereby selectively outputting light of a wavelength band or a color, which corresponds to each sub-pixel SP. The color filter layer CFL may include color filters CF respectively corresponding to the first to third sub-pixels SP1, SP2, and SP3. Each of the color filters CF may allow light having a wavelength band corresponding to a corresponding sub-pixel SP to pass therethrough. For example, a color filter CF corresponding to the first sub-pixel SP1 may allow light of a red color to pass therethrough, a color filter CF corresponding to the second sub-pixel SP2 may allow light of a green color to pass therethrough, and a color filter CF corresponding to the third sub-pixel SP3 may allow light of a blue color to pass therethrough. According to light emitted from the light-emitting structure EMS in each sub-pixel SP, at least some of the color filters CF may be omitted.

The lens array LA may be located on the color filter layer CFL. The lens array LA may include lenses LS respectively corresponding to the first to third sub-pixels SP1, SP2, and SP3. Each of the lenses LS may output light emitted from the light-emitting structure EMS along an intended path, thereby improving light emission efficiency. The lens array LA may have a relatively high refractive index. For example, the lens array LA may have a refractive index higher than a refractive index of the overcoat layer OC. In embodiments, the lenses LS may include an organic material. In embodiments, the lenses LS may include an acryl-based material. However, the material of the lenses LS is not limited thereto.

In embodiments, as compared with the opening OP of the pixel-defining layer PDL, at least some of the color filters CF of the color filter layer CFL and at least some of the lenses LS of the lens array LA may be shifted in a direction parallel to a plane defined by the first and second directions DR1 and DR2. For example, in a central area of the display area DA, the center of a color filter CF and the center of a lens LS may be aligned or overlap with the center of a corresponding opening OP of the pixel-defining layer PDL. For example, in the central area of the display area DA, the opening OP of the pixel-defining layer PDL may completely overlap with the corresponding color filter CF of the color filter layer CFL and the corresponding lens LS of the lens array LA. In an area of the display area DA, which is adjacent to the non-display area NDA, the center of a color filter CF and the center of a lens LS may be shifted in a planar direction from the center of an opening OP of the pixel-defining layer PDL. For example, in the area of the display area DA, which is adjacent to the non-display area NDA, the opening OP of the pixel-defining layer PDL may partially overlap with the corresponding color filter CF of the color filter layer CFL and the corresponding lens LS of the lens array LA. Accordingly, in the center of the display area DA, light emitted from the light-emitting structure EMS can be effectively output in a normal direction of the display surface. At an outer portion of the display area DA, light emitted from the light-emitting structure EMS can be effectively output in a direction inclined by an angle (e.g., a predetermined angle) with respect to the normal direction of the display surface.

The overcoat layer OC may be located over the lens array LA. The overcoat layer OC may cover the optical functional layer OFL, the encapsulation layer TFE, the light-emitting structure EMS, and/or the pixel circuit layer PCL. The overcoat layer OC may include various materials suitable for protecting lower layers thereof from foreign matters, such as dust and moisture. For example, the overcoat layer OC may include at least one of an inorganic insulating layer and an organic insulating layer. For example, the overcoat layer OC may include epoxy resin, but embodiments are not limited thereto. The overcoat layer OC may have a refractive index lower than a refractive index of the lens array LA.

The cover window CW may be located on the overcoat layer OC. The cover window CW may be configured to protect lower layers thereof. The cover window CW may have a refractive index higher than the refractive index of the overcoat layer OC. The cover window CW may include glass, but embodiments are not limited thereto. For example, the cover window CW may be an encapsulation glass configured to protect components located thereunder. In other embodiments, the cover window CW may be omitted.

Figure 6:
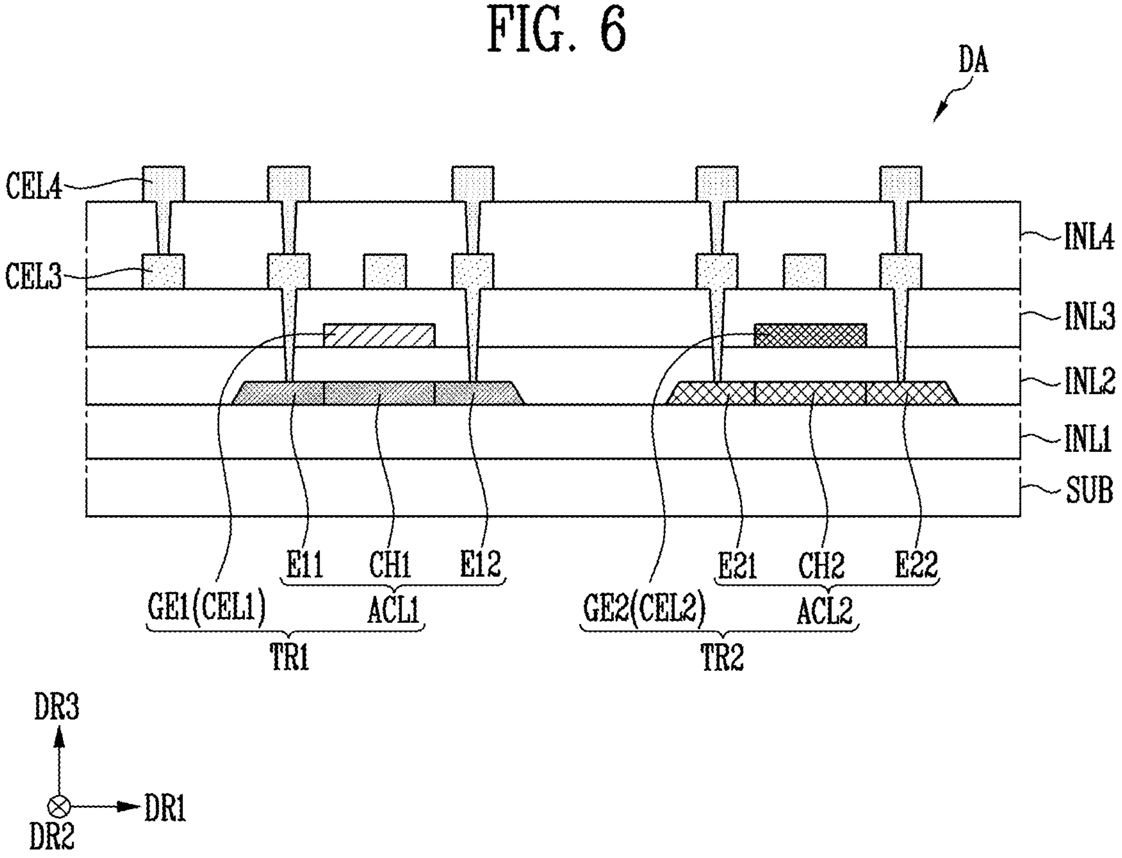
FIG. 6 is a view illustrating a stacked structure of a display area of the display panel.

FIG. 6 is a view illustrating a stacked structure of the display area of the display panel.

Referring to FIGS. 5 and 6, the display area DA of the display panel DP may have a structure in which a substrate SUB, a first insulating layer INL1, a first active layer ACL1, a second active layer ACL2, a second insulating layer INL2, a first electrode layer CEL1, a second electrode layer CEL2, a third insulating layer INS3, a third electrode layer CEL3, a fourth insulating layer INL4, and a fourth electrode layer CEL4 are sequentially stacked.

The substrate SUB may be made of various materials, such as glass, polymer, and metal. The substrate SUB may be selected as one of a rigid substrate and a flexible substrate according to an application product. When the substrate SUB includes a polymer organic material, the substrate SUB may be formed of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, cellulose acetate propionate, or the like. On the other hand, the substrate SUB may be made of glass, fiber glass reinforced plastic (FRP), or the like.

The first active layer ACL1 and the second active layer ACL2 may correspond to a semiconductor layer. For example, the first active layer ACL1 may include a first electrode E11 and a second electrode E12, which are doped with an impurity, and a channel CH1 between the first electrode E11 and the second electrode E12. The first electrode E11 and the second electrode E12 may be doped with a P-type impurity.

The second active layer ACL2 may include a first electrode E21 and a second electrode E22, which are doped with an impurity, and a channel CH2 between the first electrode E21 and the second electrode E22. The first electrode E21 and the second electrode E22 may be doped with an N-type impurity.

In embodiments, the first active layer ACL1 is made of a poly-silicon semiconductor, and the second active layer ACL2 may be made of an oxide semiconductor.

The first active layer ACL1 may include the channel CH1, the first electrode E11, and the second electrode E12 of a first type transistor TR1 (e.g., the transistors ST1, ST2, ST3, ST4, and ST6). The first type transistor TR1 may be a P-type transistor.

The second active layer ACL2 may include the channel CH2, the first electrode E21, and the second electrode E22 of a second type transistor TR2 (e.g., the fifth transistor ST5). The second type transistor TR2 may be an N-type transistor.

A gate electrode GE1 of the first type transistor TR1 may be located in the first electrode layer CEL1. In some embodiments, a sub-gate electrode (e.g., back gate electrode, or body electrode) of the first type transistor TR1 may be located between the substrate SUB and the first insulating layer INL1.

A gate electrode GE2 of the second type transistor TR2 may be located in the second electrode layer CEL2.

The first electrode layer CEL1, the second electrode layer CEL2, the third electrode layer CEL3, and the fourth electrode layer CEL4 may correspond to a conductor layer. Each electrode layer may be configured as a single layer or a multi-layer, and may be formed using a conductor known in the art, such as gold (Au), silver (Ag), aluminum (Al), molybdenum (Mo), chromium (Cr), titanium (Ti), nickel (Ni), neodymium (Nd), copper (Cu), platinum (Pt), or the like.

The first insulating layer INL1, the second insulating layer INL2, the third insulating layer INL3, and the fourth insulating layer INL4 may be interposed to respectively electrically separate the active layers ACL1 and ACL2 and the first to fourth electrode layers CEL1, CEL2, CEL3, and CEL4 from each other. Suitable electrode patterns may be connected to each other through a contact hole formed in respective ones of the insulating layers INL1 to INL4.

The insulating layers INL1 to INL4 may be configured with an organic insulating layer, an inorganic insulating layer, or an organic/inorganic insulating layer, and may be formed as a single layer or a multi-layer. For example, the insulating layers INL1 to INL4 may include at least one of silicon nitride ($SiN_x$), silicon oxide ($SiO_x$), silicon oxynitride ($SiO_xN_y$), acrylic resin, epoxy resin, phenolic resin, polyamide resin, and/or polyimide resin.

Referring to FIG. 6, it is illustrated that the first active layer ACL1 and the second active layer ACL2 are located in the same layer. However, the present disclosure is not limited thereto. In some embodiments, the first active layer ACL1 and the second active layer ACL2 may be located in different layers.

Figure 7:
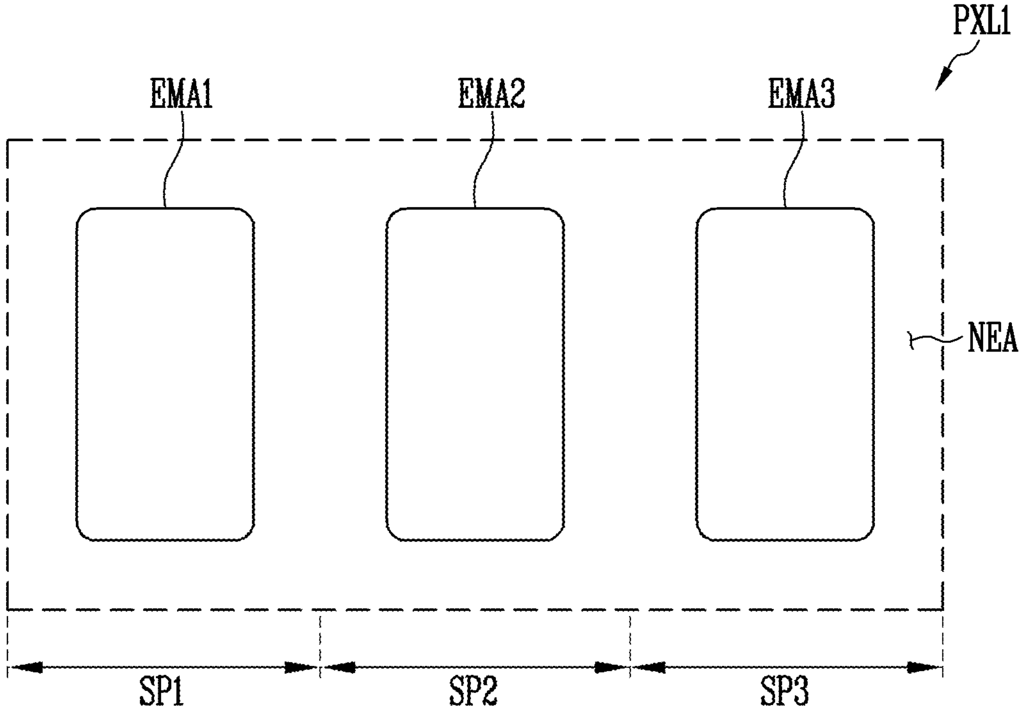
FIG. 7 is a plan view illustrating one or more embodiments of any one of pixels shown in FIG. 5.

FIG. 7 is a plan view illustrating one or more embodiments of any one of the pixels shown in FIG. 5. In FIG. 7, for clear and brief description, the first pixel PXL1 among the first and second pixels PXL1 and PXL2 shown in FIG. 5 is schematically illustrated. The other pixels may be configured identically to the first pixel PXL1.

Referring to FIGS. 5 and 7, the first pixel PXL1 may include first to third sub-pixels SP1 to SP3.

The first sub-pixel SP1 may include a first emission area EMA1, and a non-emission area NEA at the periphery of the first emission area EMA1. The second sub-pixel SP2 may include a second emission area EMA2, and the non-emission area NEA at the periphery of the second emission area EMA2. The third sub-pixel SP3 may include a third emission area EMA3, and the non-emission area NEA at the periphery of the third emission area EMA3.

The first emission area EMA1 may be an area in which light is emitted from a portion of the light-emitting structure EMS (see FIG. 5), which corresponds to the first sub-pixel SP1. The second emission area EMA2 may be an area in which light is emitted from a portion of the light-emitting structure EMS, which corresponds to the second sub-pixel SP2. The third emission area EMA3 may be an area in which light is emitted from a portion of the light-emitting structure EMS, which corresponds to the third sub-pixel SP3.

FIGS. 8 to 14 are views illustrating a planar layout of a pixel configured with the sub-pixels shown in FIG. 3.

Figure 8:
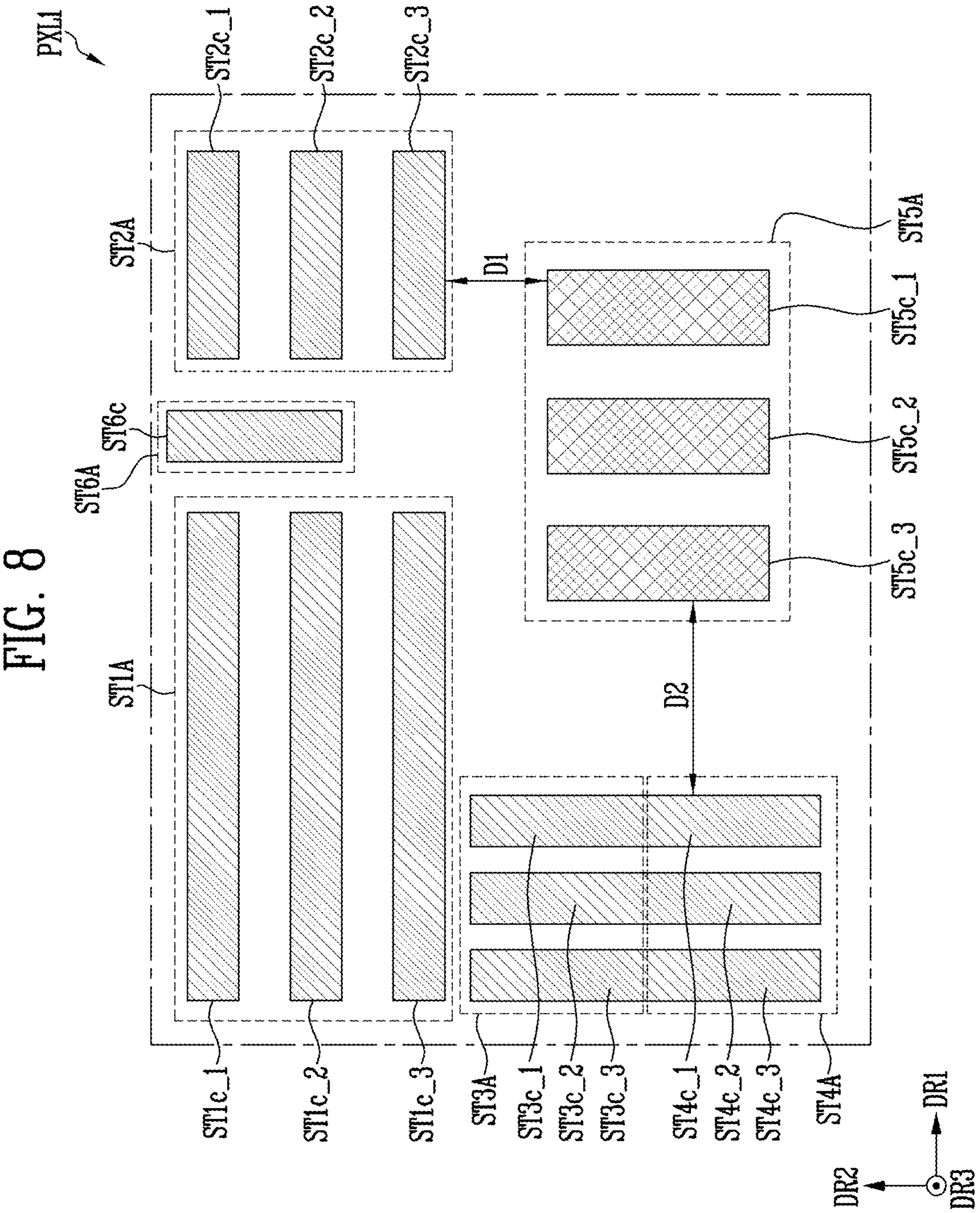
FIGS. 8 to 14 are views illustrating a planar layout of a pixel configured with the sub-pixels shown in FIG. 3.

Referring to FIGS. 3, 7, and 8, a first active layer ACL1 and a second active layer ACL2 of the first pixel PXL1 are illustrated. Each of the first to third sub-pixels SP1 to SP3 of the first pixel PXL1 may be the sub-pixel SPij shown in FIG. 3.

Hereinafter, for convenience of description, first to sixth transistors ST1 to ST6 included in the first sub-pixel SP1 are designated as (1_1)th to (6_1)th transistors, respectively, first to sixth transistors ST1 to ST6 included in the second sub-pixel SP2 are designated as (1_2)th to (6_2)th transistors, respectively, and first to sixth transistors ST1 to ST6 included in the third sub-pixel SP3 are designated as (1_3)th to (6_3)th transistors, respectively.

The first active layer ACL1 may include channels of the transistors ST1, ST2, ST3, ST4, and ST6 of each of the first to third sub-pixels SP1 to SP3.

For example, the first active layer ACL1 may include a channel ST1*c*_1 of the (1_1)th transistor of the first sub-pixel SP1, a channel ST2*c*_1 of the (2_1)th transistor of the first sub-pixel SP1, a channel ST3*c*_1 of the (3_1)th transistor of the first sub-pixel SP1, and a channel ST4*c*_1 of the (4_1)th transistor of the first sub-pixel SP1.

The first active layer ACL1 may include a channel ST1*c*_2 of the (1_2)th transistor of the second sub-pixel SP2, a channel ST2*c*_2 of the (2_2)th transistor of the second sub-pixel SP2, a channel ST3*c*_2 of the (3_2)th transistor of the second sub-pixel SP2, and a channel ST4*c*_2 of the (4_2)th transistor of the second sub-pixel SP2.

The first active layer ACL1 may include a channel ST1*c*_3 of the (1_3)th transistor of the third sub-pixel SP3, a channel ST2*c*_3 of the (2_3)th transistor of the third sub-pixel SP3, a channel ST3*c*_3 of the (3_3)th transistor of the third sub-pixel SP3, and a channel ST4*c*_3 of the (4_3)th transistor of the third sub-pixel SP3.

Also, the first active layer ACL1 may include a channel ST6*c* obtained by integrating channels of the sixth transistors ST6 of the first to third sub-pixels SP1 to SP3.

Portions of the first active layer ACL1, which are spaced apart from each other with a channel interposed therebetween, may constitute a first electrode and a second electrode of each of the transistors ST1, ST2, ST3, ST4, and ST6.

The second active layer ACL2 may include a channel ST5*c*_1 of the (5_1)th transistor of the first sub-pixel SP1, a channel ST5*c*_2 of the (5_2)th transistor of the second sub-pixel SP2, and a channel ST5*c*_3 of the (5_3)th transistor of the third sub-pixel SP3.

Portions of the second active layer ACL2, which are spaced apart from each other with a channel interposed therebetween, may constitute a first electrode and a second electrode of the fifth transistor ST5.

Referring to FIG. 8, channels of transistors performing the same function or the same operation among the transistors ST1 to ST6 of each of the first to third sub-pixels SP1 to SP3 may be located adjacent to each other.

The first transistors ST1 of the first to third sub-pixels SP1 to SP3 may be located in a first channel area ST1A, the second transistors ST2 of the first to third sub-pixels SP1 to SP3 may be located in a second channel area ST2A, the third transistors ST3 of the first to third sub-pixels SP1 to SP3 may be located in a third channel area ST3A, the fourth transistors ST4 of the first to third sub-pixels SP1 to SP3 may be located in a fourth channel area ST4A, the fifth transistors ST5 of the first to third sub-pixels SP1 to SP3 may be located in a fifth channel area ST5A, and the sixth transistors ST6 of the first to third sub-pixels SP1 to SP3 may be integrated to be located in a sixth channel area ST6A.

For example, the channel ST1*c*_1 of the (1_1)th transistor of the first sub-pixel SP1, the channel ST1*c*_2 of the (1_2)th transistor of the second sub-pixel SP2, and the channel ST1*c*_3 of the (1_3)th transistor of the third sub-pixel SP3 may be located in the first channel area ST1A.

The channel ST2*c*_1 of the (2_1)th transistor of the first sub-pixel SP1, the channel ST2*c*_2 of the (2_2)th transistor of the second sub-pixel SP2, and the channel ST2*c*_3 of the (2_3)th transistor of the third sub-pixel SP3 may be located in the second channel area ST2A.

The channel ST3*c*_1 of the (3_1)th transistor of the first sub-pixel SP1, the channel ST3*c*_2 of the (3_2)th transistor of the second sub-pixel SP2, and the channel ST3*c*_3 of the (3_3)th transistor of the third sub-pixel SP3 may be located in the third channel area ST3A.

The channel ST4*c*_1 of the (4_1)th transistor of the first sub-pixel SP1, the channel ST4*c*_2 of the (4_2)th transistor of the second sub-pixel SP2, and the channel ST4*c*_3 of the (4_3)th transistor of the third sub-pixel SP3 may be located in the fourth channel area ST4A.

The channel ST5*c*_1 of the (5_1)th transistor of the first sub-pixel SP1, the channel ST5*c*_2 of the (5_2)th transistor of the second sub-pixel SP2, and the channel ST5*c*_3 of the (5_3)th transistor of the third sub-pixel SP3 may be located in the fifth channel area ST5A.

The channel ST6*c* of the sixth transistors ST6 of the first to third sub-pixels SP1 to SP3 may be located in the sixth channel area ST6A. The channels of the sixth transistors ST6 of the first to third sub-pixels SP1 to SP3 may be integrated to be located in the sixth channel area ST6A. Channels of some of the transistors of the first to third sub-pixels SP1 to SP3 are integrated, so that a mounting space of pixels can be secured.

That is, the transistors included in the first pixel PXL1 are not divided according to which sub-pixel the transistors constitute, but may be divided according to functions of the transistors included in the first pixel PXL1.

Accordingly, a channel of another transistor instead of the first transistor ST1 may be omitted from between (e.g., may not be between) the channels ST1*c*_1, ST1*c*_2, and ST1*c*_3 included in the first channel area ST1A. Similarly to this, a channel of a transistor performing another function may be omitted from between (e.g., may not be between) the channels included in each of the second to sixth channel areas ST2A to ST6A.

In embodiments, a distance between the channel ST1*c*_1 of the (1_1)th transistor and the channel ST2*c*_1 of the (2_1)th transistor may be longer than a distance between the channel ST1*c*_1 of the (1_1)th transistor and the channel ST1*c*_2 of the (1_2)th transistor.

As the transistors included in the first pixel PXL1 are divided according to functions of the transistors included in the first pixel PXL1, a separation distance required between the first active layer ACL1 and the second active layer ACL2 on a plane may decrease. For example, a distance D1 between a channel of the second channel area ST2A and a channel of the fifth channel area ST5A, and a distance D2 between a channel of the fourth channel area ST4A and a channel of the fifth channel area ST5A, may decrease as compared with the existing corresponding distances. Accordingly, a mounting space of pixels can be secured, and a high resolution pixel can be provided.

On a plane, the first channel area ST1A, the second channel area ST2A, the third channel area ST3A, the fourth channel area ST4A, and the sixth channel area ST6A, which are located in the first active layer ACL1, may be located adjacent to each other.

In embodiments, on a plane, the third channel area ST3A and the fourth channel area ST4A may be in contact with each other without any separation distance.

In embodiments, on a plane, a distance between an area located in the first active layer ACL1 and the fifth channel area ST5A located in the second active layer ACL2 may be greater than a distance between areas adjacent to each other among the areas located in the first active layer ACL1.

For example, on a plane, a distance between the second channel area ST2A and the fifth channel area ST5A may be greater than a distance between the second channel area ST2A and the sixth channel area ST6A. On a plane, a distance between the third channel area ST3A and the fifth channel area ST5A may be greater than a distance between the third channel area ST3A and the first channel area ST1A.

That is, active layers between transistors of the same type, which are shown in FIG. 3, are adjacent to each other, a mounting space of pixels can be secured and a high resolution pixel can be provided. Further, a separation distance between active layers of different types of transistors is secured, so that interference between different types of transistors can be reduced.

In addition, while the channels included in the first channel area ST1A and the second channel area ST2A are located along the second direction DR2, the channels included in the third to sixth channel areas ST3A to ST6A may be located along the first direction DR1. That is, the channels included in the first pixel PXL1 may be located along different directions.

The present disclosure is not limited to the structure in which the channels shown in FIG. 8 are located, and the channels may be variously located in some embodiments. For example, the channels ST1*c*_1, ST1*c*_2, and ST1*c*_3 located in the first channel area ST1A may be located differently from the structure the channels are located in FIG. 8. Similarly to this, channels located in other channel areas may be located differently from the structure in which the channels are located in FIG. 8.

Figure 9:
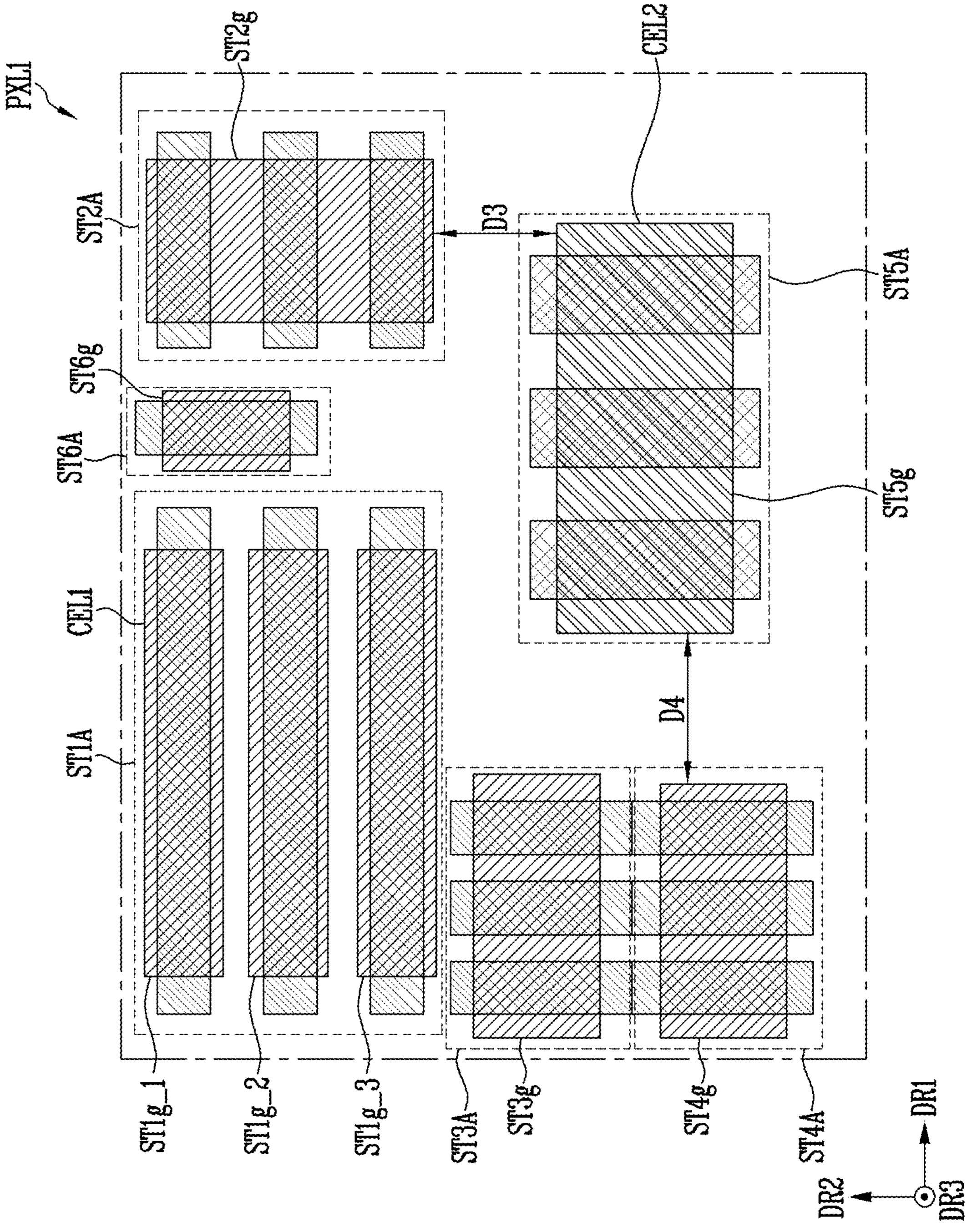

Referring to FIGS. 8 and 9, patterns of a first electrode layer CEL1 and a second electrode layer CEL2 are additionally illustrated. The first electrode layer CEL1 may include gate electrodes ST1*g*_1, ST1*g*_2, ST1*g*_3, ST2*g*, ST3*g*, ST4*g*, and ST6*g* of the transistors ST1, ST2, ST3, ST4, and ST6. The second electrode layer CEL2 may include a gate electrode ST5*g* of the fifth transistor ST5.

Referring to FIGS. 3, 8, and 9, the gate electrode ST1*g*_1 of the first transistor ST1 of the first sub-pixel SP1 may overlap with the channel ST1*c*_1 of the first transistor ST1 of the first sub-pixel SP1. The gate electrode ST1*g*_2 of the first transistor ST1 of the second sub-pixel SP2 may overlap with the channel ST1*c*_2 of the first transistor ST1 of the second sub-pixel SP2. The gate electrode ST1*g*_3 of the first transistor ST1 of the third sub-pixel SP3 may overlap with the channel ST1*c*_3 of the first transistor ST1 of the third sub-pixel SP3.

As channels of transistors performing the same function or the same operation among the transistors ST1 to ST6 of each of the first to third sub-pixels SP1 to SP3 are located adjacent to each other, one gate electrode may be located in a channel area including other transistors except the first transistor ST1 as a driving transistor.

For example, in the case of gate electrodes of the second transistors ST2 of the first to third sub-pixels SP1 to SP3, the gate electrodes may be integrated into one gate electrode ST2*g*. Accordingly, one second gate electrode ST2*g* may be located in the second channel area ST2A. On a plane, the gate electrode ST2*g* of the second transistor ST2 may overlap with the channel ST2*c*_1 of the second transistor ST2 of the first sub-pixel SP1, the channel ST2*c*_2 of the second transistor ST2 of the second sub-pixel SP2, and the channel ST2*c*_3 of the second transistor ST2 of the third sub-pixel SP3.

In the case of gate electrodes of the third transistors ST3 of the first to third sub-pixels SP1 to SP3, the gate electrodes may be integrated into one gate electrode ST3*g*. Accordingly, one third gate electrode ST3*g* may be located in the third channel area ST3A. On a plane, the gate electrode ST3*g* of the third transistor ST3 may overlap with the channel ST3*c*_1 of the third transistor ST3 of the first sub-pixel SP1, the channel ST3*c*_2 of the third transistor ST3 of the second sub-pixel SP2, and the channel ST3*c*_3 of the third transistor ST3 of the third sub-pixel SP3.

In the case of gate electrodes of the fourth transistors ST4 of the first to third sub-pixels SP1 to SP3, the gate electrodes may be integrated into one gate electrode ST4*g*. Accordingly, one fourth gate electrode ST4*g* may be located in the fourth channel area ST4A. On a plane, the gate electrode ST4*g* of the fourth transistor ST4 may overlap with the channel ST4*c*_1 of the fourth transistor ST4 of the first sub-pixel SP1, the channel ST4*c*_2 of the fourth transistor ST4 of the second sub-pixel SP2, and the channel ST4*c*_3 of the fourth transistor ST4 of the third sub-pixel SP3.

In the case of gate electrodes of the fifth transistors ST5 of the first to third sub-pixels SP1 to SP3, the gate electrodes may be integrated into one gate electrode ST5*g*. Accordingly, one fifth gate electrode ST5*g* may be located in the fifth channel area ST5A. On a plane, the gate electrode ST5*g* of the fifth transistor ST5 may overlap with the channel ST5*c*_1 of the fifth transistor ST5 of the first sub-pixel SP1, the channel ST5*c*_2 of the fifth transistor ST5 of the second sub-pixel SP2, and the channel ST5*c*_3 of the fifth transistor ST5 of the third sub-pixel SP3.

In the case of gate electrodes of the sixth transistors ST6 of the first to third sub-pixels SP1 to SP3, the gate electrodes may be integrated into one gate electrode ST6*g*. Accordingly, one sixth gate electrode ST6*g* may be located in the sixth channel area ST6A. On a plane, the gate electrode ST6*g* may overlap with the channel ST6*c* of the sixth transistor ST6.

As the transistors included in the first pixel PXL1 are divided according to function of the transistors included in the first pixel PXL1, on a plane, a separation distance required between a gate electrode overlapping with the first active layer ACL1 and a gate electrode overlapping with the second active layer ACL2 may decrease.

For example, a distance D3 between the second gate electrode ST2*g* and the fifth gate electrode ST5*g*, and a distance D4 between the fourth gate electrode ST4*g* and the fifth gate electrode ST5*g*, may decrease as compared with the existing corresponding distances. Accordingly, a mounting space of pixels can be secured, and a high resolution pixel can be provided.

Figure 10:
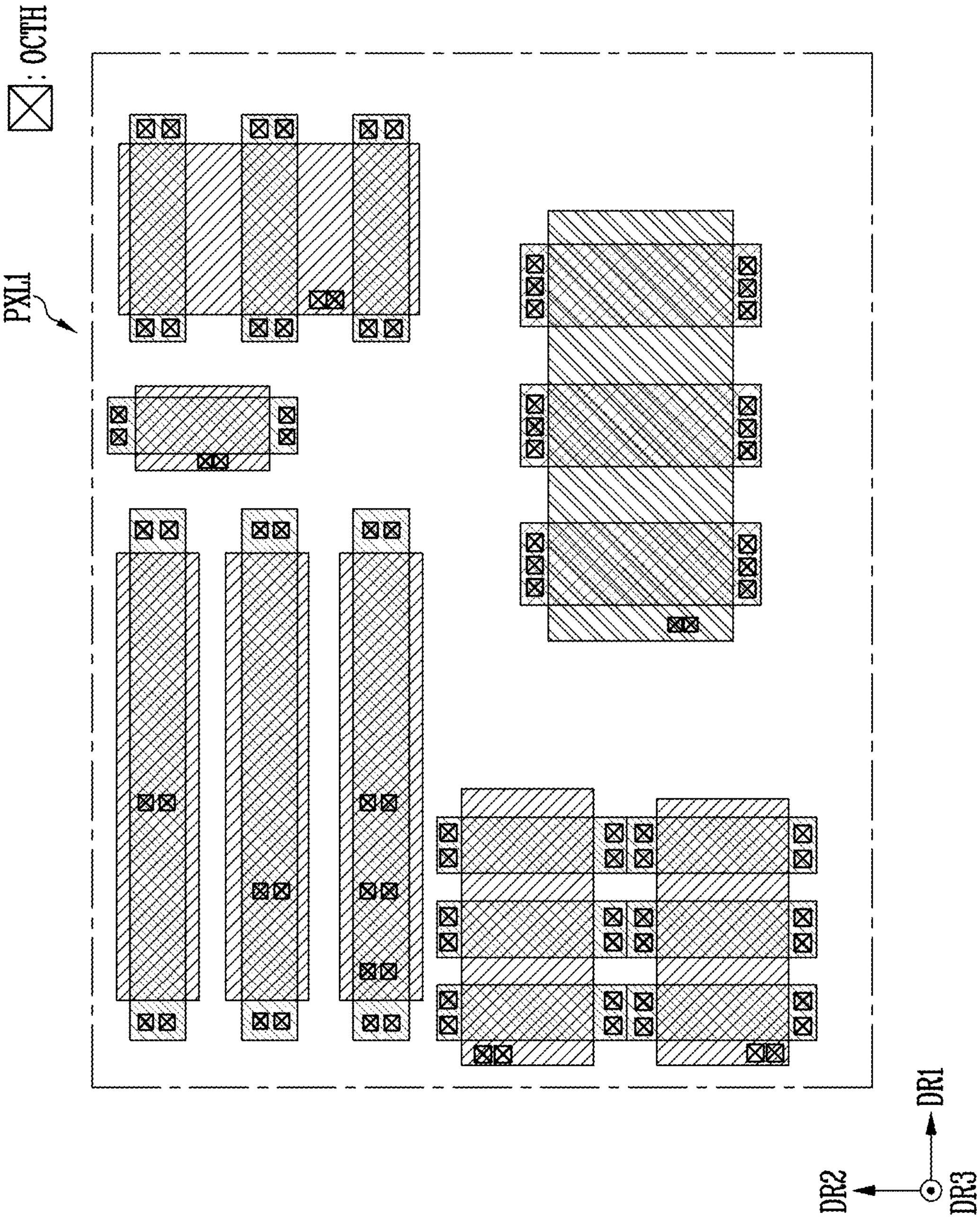

Referring to FIG. 10, contact holes OCTH are illustrated. The contact holes OCTH may be holes etched to be connected to an electrode layer under which patterns of a third electrode layer CEL3 exist, the first active layer ACL1, and the second active layer ACL2.

Figure 11:
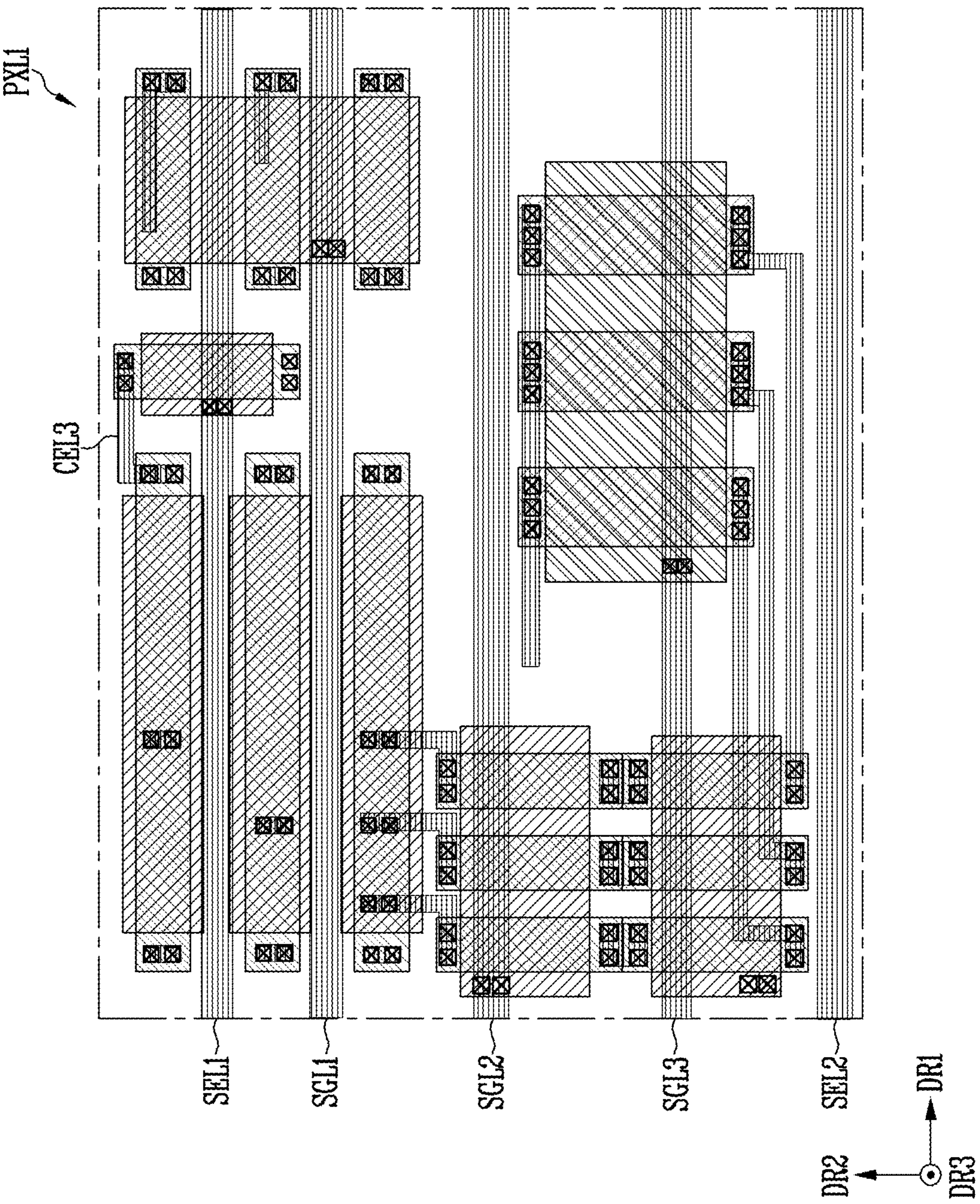

Referring to FIG. 11, patterns of the third electrode layer CEL3 are additionally illustrated. Some patterns of the third electrode layer CEL3 may constitute a first sub-gate line SGL1, a second sub-gate line SGL2, a third sub-gate line SGL3, a first sub-emission control line SEL1, and a second sub-emission control line SEL2.

Figure 12:
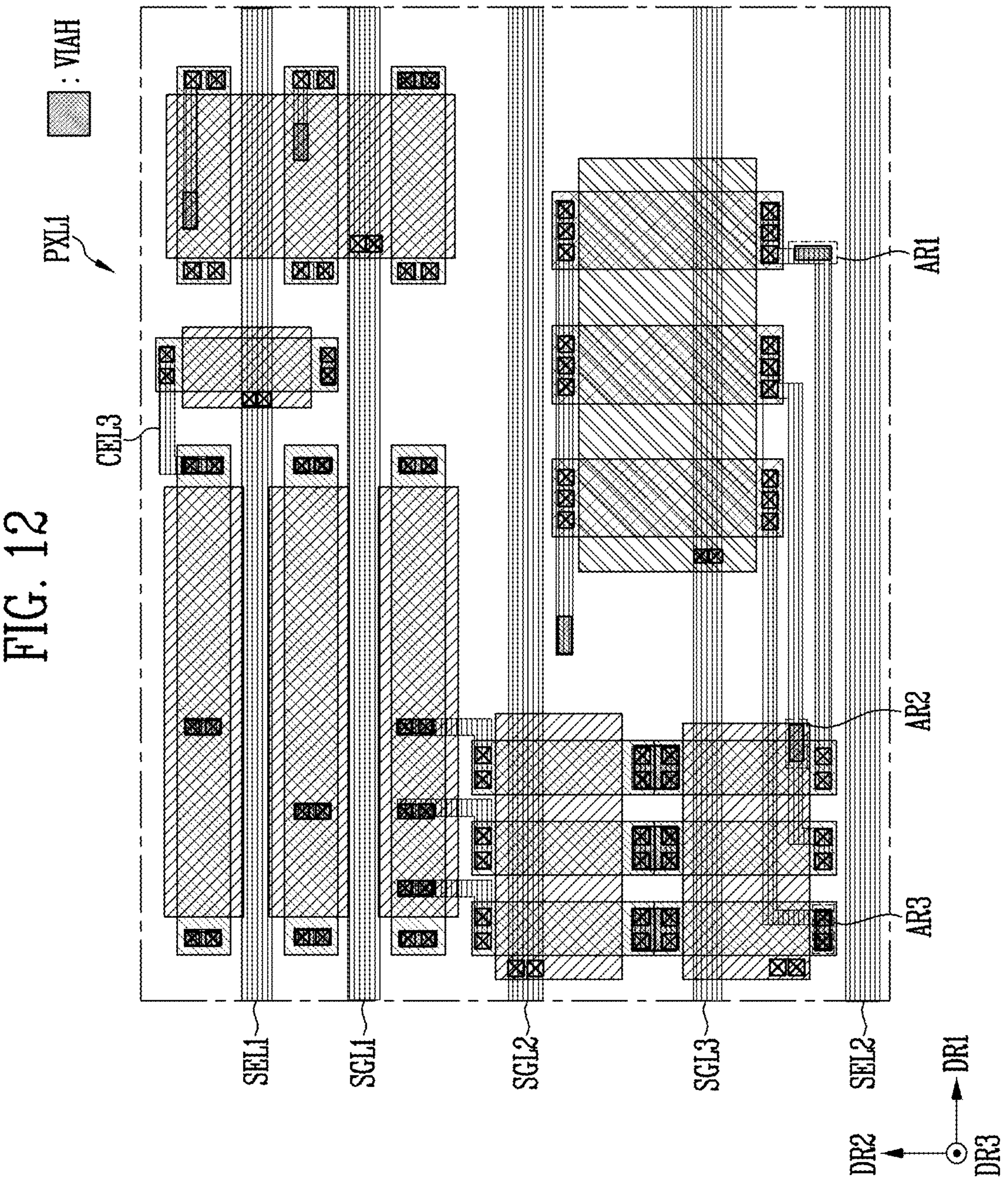

Referring to FIG. 12, via holes VIAH are illustrated. The via holes VIAH may be holes etched to be connected to an electrode layer (e.g., the third electrode layer CEL3) under which patterns of a fourth electrode layer CEL4 exist.

A via hole VIAH included in a first area AR1 among the via holes VIAH may be a hole for connecting an anode electrode AE of the first sub-pixel SP1 to the fourth transistor ST4 and the fifth transistor ST5 of the first sub-pixel SP1.

A via hole VIAH included in a second area AR2 among the via holes VIAH may be a hole for connecting an anode electrode AE of the second sub-pixel SP2 to the fourth transistor ST4 and the fifth transistor ST5 of the second sub-pixel SP2.

A via hole VIAH included in a third area AR3 among the via holes VIAH may be a hole for connecting an anode electrode AE of the third sub-pixel SP3 to the fourth transistor ST4 and the fifth transistor ST5 of the third sub-pixel SP3.

On a plane, the second area AR2 may overlap with the fourth transistor ST4 of the first sub-pixel SP1. That is, on a plane, a via hole VIAH for connecting the anode electrode AE included in the second sub-pixel SP2 to transistors and a transistor included in the first sub-pixel SP1 may overlap with each other.

Figure 13:
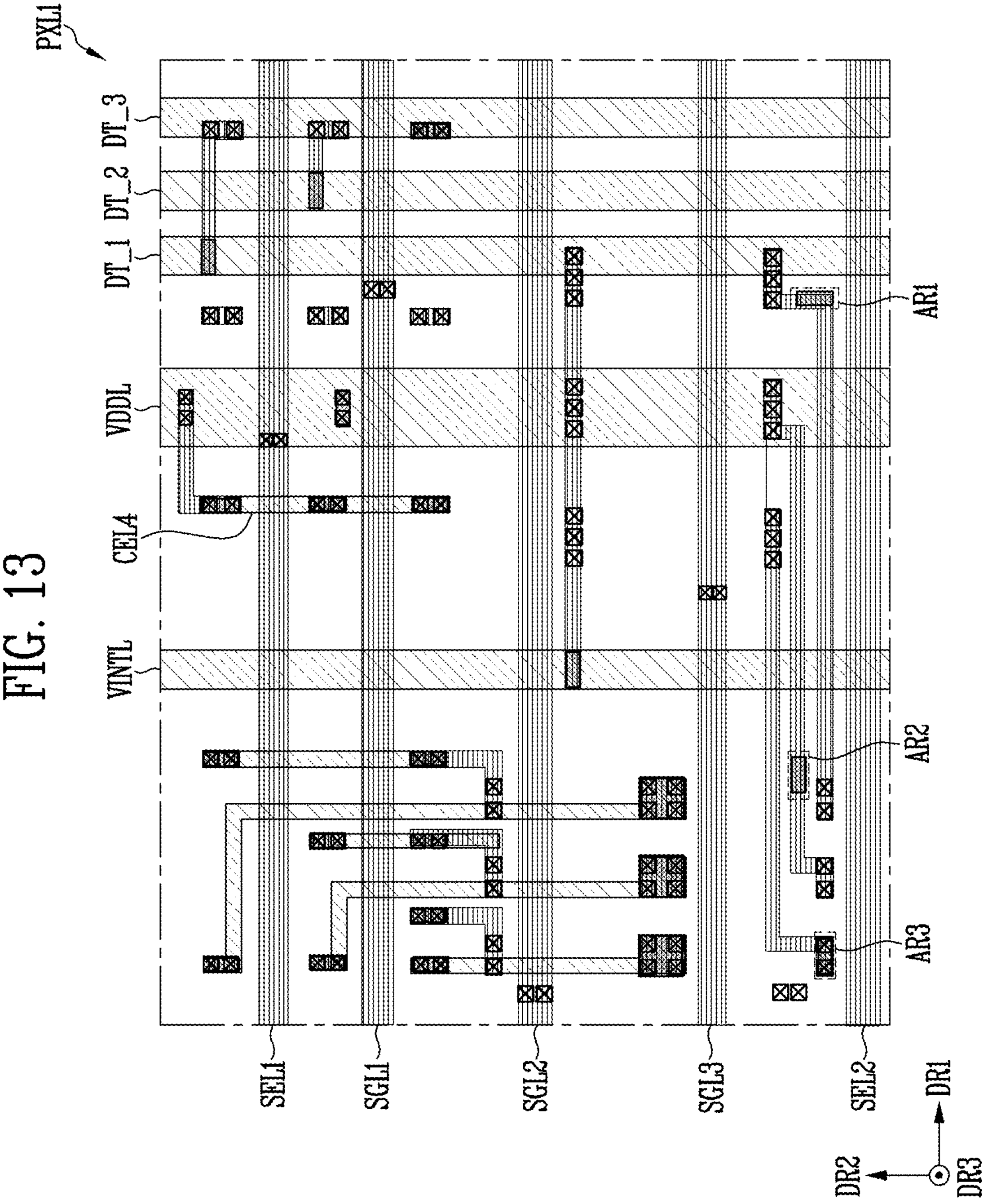

Referring to FIG. 13, patterns of a fourth electrode layer CEL4 and via holes VIAH are illustrated. Some patterns of the fourth electrode layer CEL4 may constitute an initialization line VINTL, a first power voltage line VDDL, a first data line DT_1, a second data line DT_2, and a third data line DT_3.

An initialization voltage may be applied to the initialization line VINTL. The initialization line VINTL may include an initialization voltage node VINTN (see FIG. 3).

A first power voltage may be applied to the first power voltage line VDDL. The first power voltage line VDDL may include a first power voltage node VDDN (see FIG. 3).

A data signal provided to each of the first to third sub-pixels SP1 to SP3 may be applied to the first data line DT_1, the second data line DT_2, and the third data line DT_3. For example, a first data signal may be applied to the first sub-pixel SP1 through the first data line DT_1, a second data signal may be applied to the second sub-pixel SP2 through the second data line DT_2, and a third data signal may be applied to the third sub-pixel SP3 through the third data line DT_3.

The fourth electrode layer CEL4 located in the first area AR1 may connect the anode electrode AE of the first sub-pixel SP1 to the third electrode layer CEL3 connected between the fourth transistor ST4 and the fifth transistor ST5 of the first sub-pixel SP1.

The fourth electrode layer CEL4 located in the second area AR2 may connect the anode electrode AE of the second sub-pixel SP2 to the third electrode layer CEL3 connected between the fourth transistor ST4 and the fifth transistor ST5 of the second sub-pixel SP2.

The fourth electrode layer CEL4 located in the third area AR3 may connect the anode electrode AE of the third sub-pixel SP3 to the third electrode layer CEL3 connected between the fourth transistor ST4 and the fifth transistor ST5 of the third sub-pixel SP3.

On a plane, the second area AR2 may overlap with the fourth transistor ST4 of the first sub-pixel SP1. That is, on a plane, the fourth electrode layer CEL4 connecting the anode electrode AE included in the second sub-pixel SP2 to transistors, and a transistor included in the first sub-pixel SP1, may overlap with each other.

Figure 14:
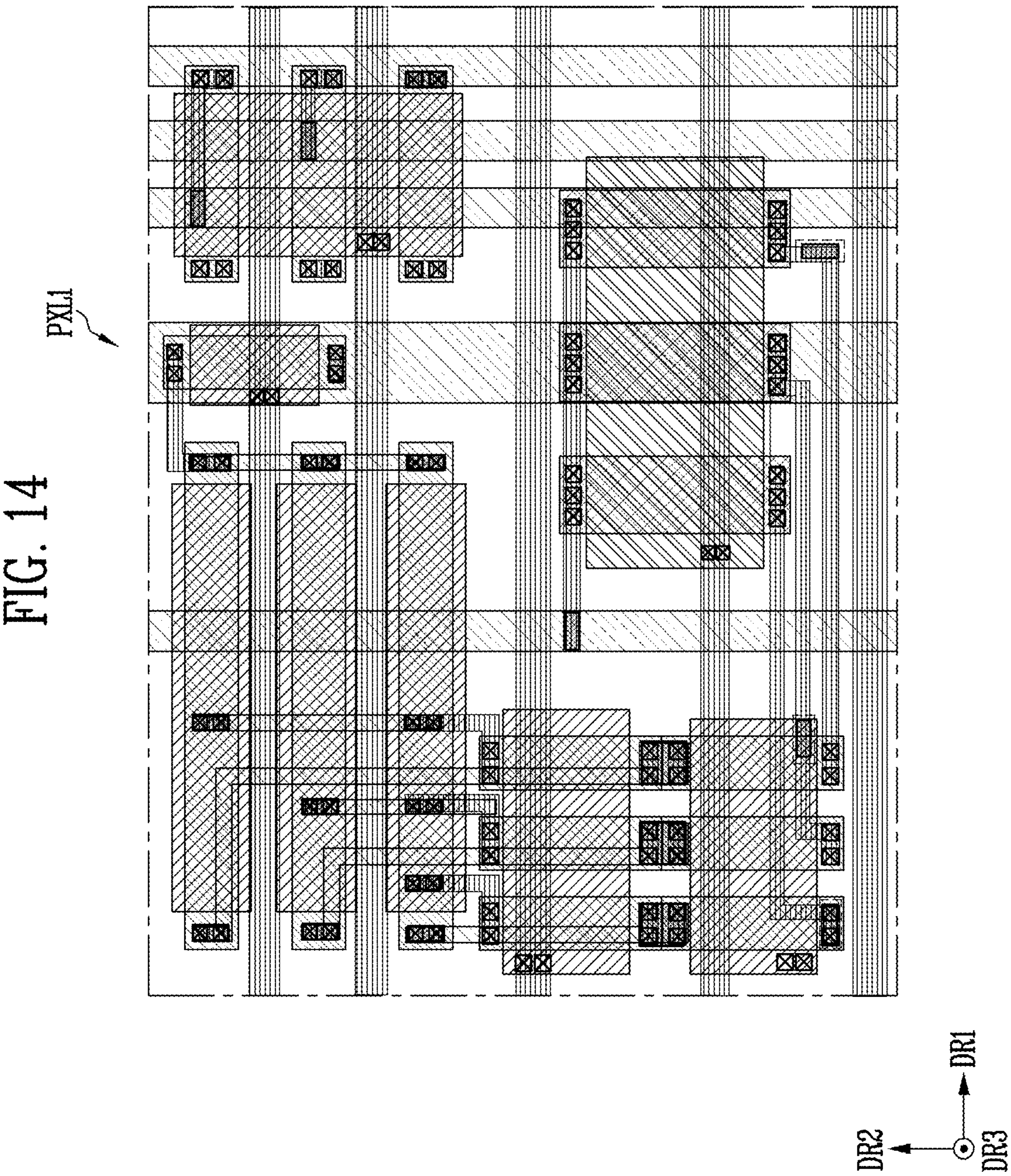

In FIG. 14, a layout is illustrated, in which the first active layer ACL1, the second active layer ACL2, the first electrode layer CEL1, the second electrode layer CEL2, the third electrode layer CEL3, and the fourth electrode layer CEL4 overlap with each other.

Figure 15:
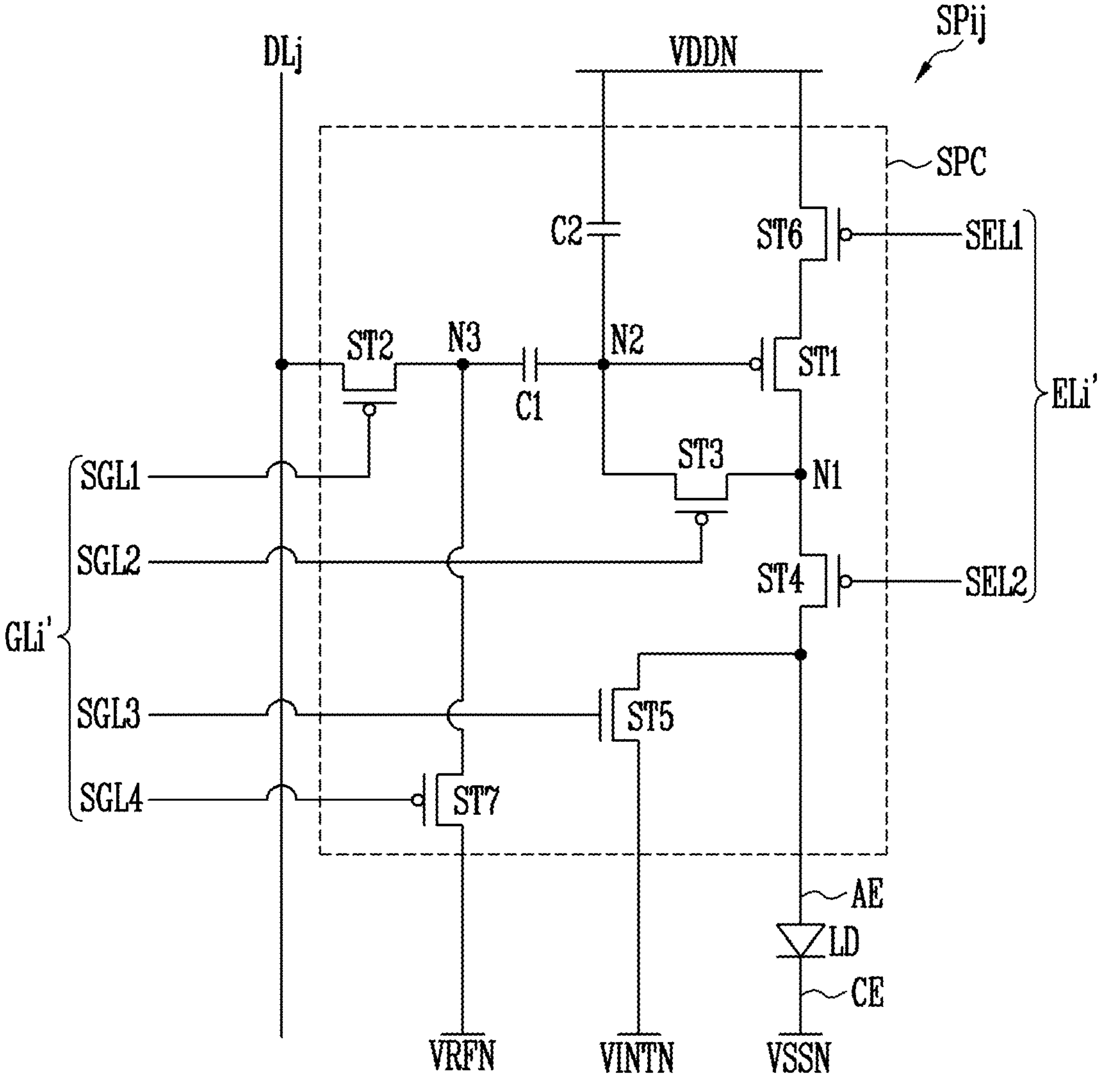
FIG. 15 is a circuit diagram illustrating one or more embodiments of the sub-pixel shown in FIG. 2.

FIG. 15 is a circuit diagram illustrating one or more embodiments of the sub-pixel shown in FIG. 2.

Referring to FIG. 15, the sub-pixel SPij may include a sub-pixel circuit SPC and a light-emitting element LD.

The sub-pixel circuit SPC may be connected to an ith gate line GLi', an ith emission control line ELi', and a jth data line DLj. When comparing the ith gate line GLi' with the ith gate line GLi shown in FIG. 2, the ith gate line GLi' may further include a third sub-gate line SGL3 and a fourth sub-gate line SGL4. When comparing the ith emission control line ELi' with the ith emission control line ELi shown in FIG. 2, the ith emission control line ELi' may include a first sub-emission control line SEL1 and a second sub-emission control line SEL2.

The sub-pixel circuit SPC may include first to seventh transistors ST1 to ST7 and first and second capacitors C1 and C2.

The first to sixth transistors ST1 to ST6, the first capacitor C1, and the second capacitor C2, which are shown in FIG. 15, are similar to the first to sixth transistors ST1 to ST6, the first capacitor C1, and the second capacitor C2, which are shown in FIG. 3, and therefore, overlapping descriptions will be omitted.

The first transistor ST1 may be connected between a first power voltage node VDDN and a first node N1. A gate of the first transistor ST1 may be connected to a second node N2, and accordingly, the first transistor ST1 may be turned on according to a voltage level of the second node N2.

The second transistor ST2 may be connected between the jth data line DLj and a third node N3. A gate of the second transistor ST2 may be connected to a first sub-gate line SGL1, and accordingly, the second transistor ST2 may be turned on in response to a gate signal of the first sub-gate line SGL1. The second transistor ST2 may be designated as a switching transistor.

The third transistor ST3 may be connected between the first node N1 and the second node N2. A gate of the third transistor ST3 may be connected to a second sub-gate line SGL2, and accordingly, the third transistor ST3 may be turned on in response to a gate signal of the second sub-gate line SGL2.

The fourth transistor ST4 may be connected between the first node N1 and an anode electrode AE of the light-emitting element LD. A gate of the fourth transistor ST4 may be connected to the second sub-emission control line SEL2, and accordingly, the fourth transistor ST4 may be turned on in response to an emission control signal of the second sub-emission control line SEL2.

The fifth transistor ST5 may be connected between the anode electrode AE of the light-emitting element LD and an initialization voltage node VINTN. A gate of the fifth transistor ST5 may be connected to the third sub-gate line SGL3, and accordingly, the fifth transistor ST5 may be turned on in response to a gate signal of the third sub-gate line SGL3.

The sixth transistor ST6 may be connected between the first power voltage node VDDN and the first transistor ST1. A gate of the sixth transistor ST6 may be connected to the first sub-emission control line SEL1, and accordingly, the sixth transistor ST6 may be turned on in response to an emission control signal of the first sub-emission control line SEL1.

The seventh transistor ST7 may be connected between the third node N3 and a reference power voltage node VRFN. A gate of the seventh transistor ST7 may be connected to the fourth sub-gate line SGL4, and accordingly, the seventh transistor ST7 may be turned on in response to a gate signal of the fourth sub-gate line SGL4.

The first capacitor C1 may be connected between the second node N2 and the third node N3. The second capacitor C2 may be connected between the first power voltage node VDDN and the second node N2.

As such, the sub-pixel circuit SPC may include the first to seventh transistors ST1 to ST7 and the first and second capacitors C1 and C2. However, embodiments are not limited thereto. The sub-pixel circuit SPC may be implemented as any one of various types of circuits each including a plurality of transistors and one or more capacitors.

The first to fourth transistors ST1 to ST4, the sixth transistor ST6, and the seventh transistor ST7 may be P-type transistors. The fifth transistor ST5 may be an N-type transistor. Each of the first to seventh transistors ST1 to ST7 may be a Metal Oxide Silicon Field Effect Transistor (MOSFET). However, embodiments are not limited thereto.

Figure 16:
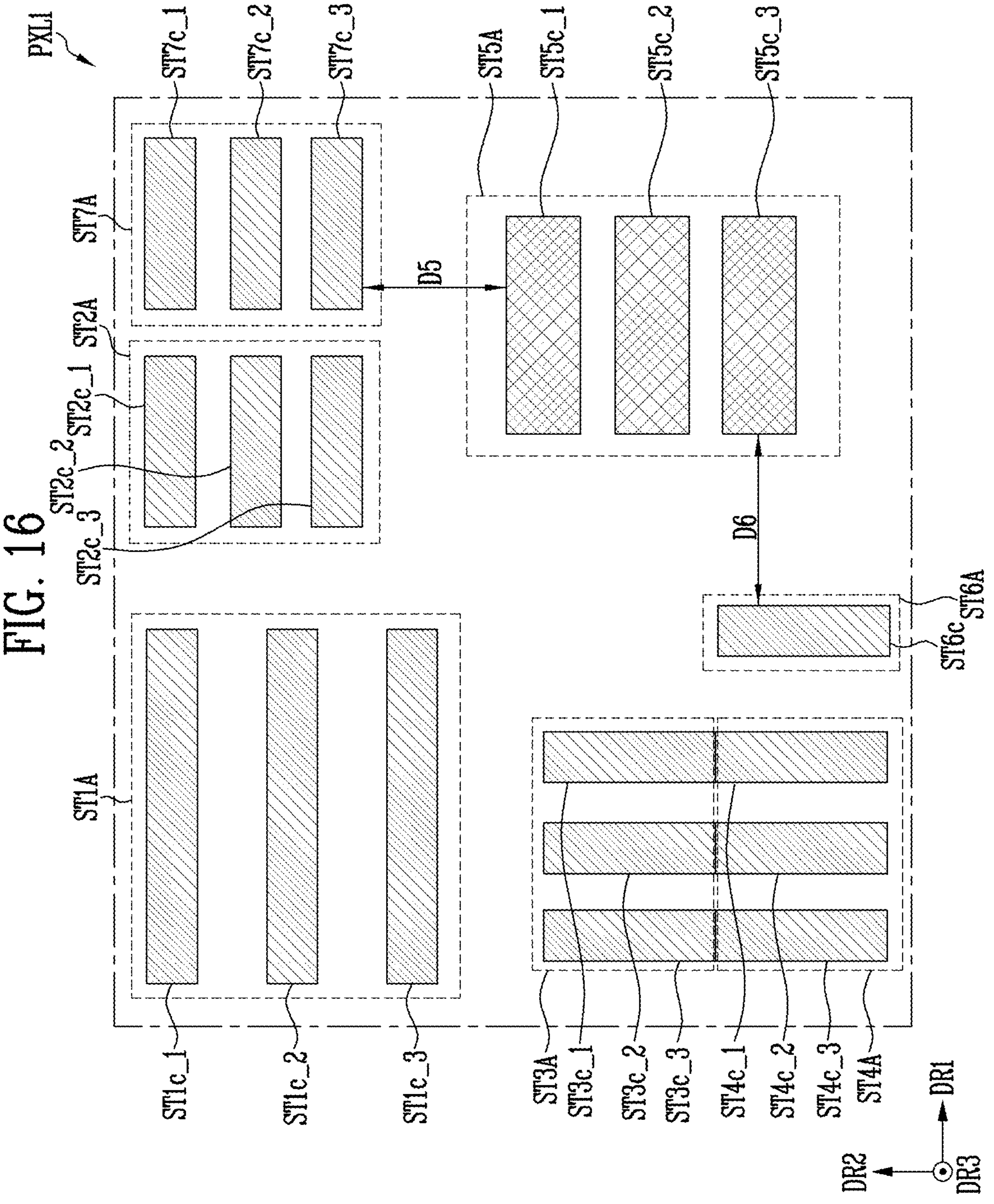
FIGS. 16 and 17 are views illustrating a planar layout of a pixel configured with the sub-pixels shown in FIG. 15.
Figure 17:
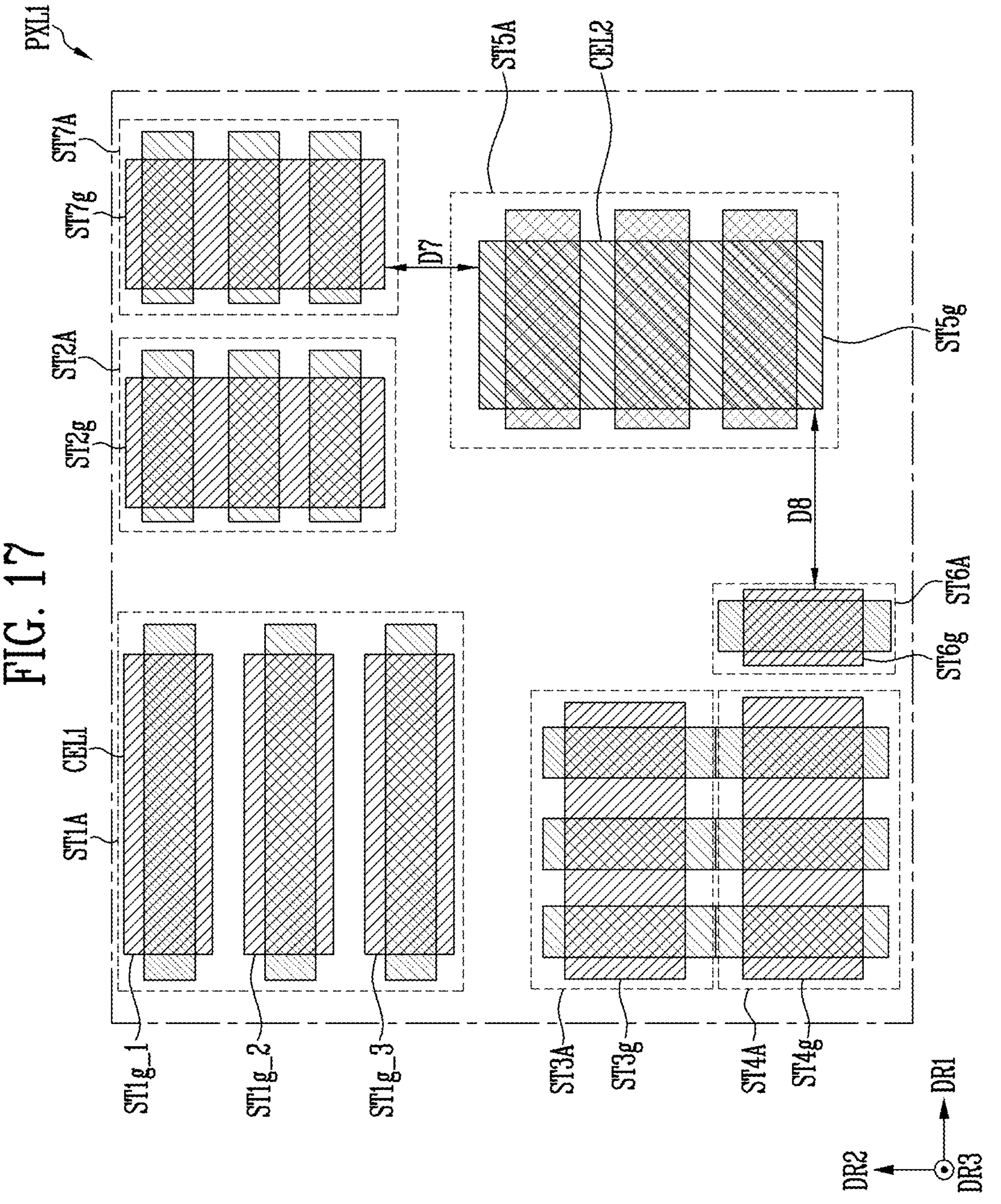

FIGS. 16 and 17 are views illustrating a planar layout of a pixel configured with the sub-pixels shown in FIG. 15.

Referring to FIGS. 7, 15, and 16, a first active layer ACL1 and a second active layer ACL2 of the first pixel PXL1 are illustrated. Each of the first to third sub-pixels SP1 to SP3 of the first pixel PXL1 may be the sub-pixel SPij shown in FIG. 15.

Hereinafter, for convenience of description, first to seventh transistors ST1 to ST7 included in the first sub-pixel SP1 are designated as (1_1)th to (7_1)th transistors, respectively, first to seventh transistors ST1 to ST7 included in the second sub-pixel SP2 are designated as (1_2)th to (7_2)th transistors, respectively, and first to seventh transistors ST1 to ST7 included in the third sub-pixel SP3 are designated as (1_3)th to (7_3)th transistors, respectively.

The first active layer ACL1 may include channels of the transistors ST1, ST2, ST3, ST4, ST6 and ST7 of each of the first to third sub-pixels SP1 to SP3.

For example, the first active layer ACL1 may include a channel ST1*c*_1 of the (1_1)th transistor of the first sub-pixel SP1, a channel ST2*c*_1 of the (2_1)th transistor of the first sub-pixel SP1, a channel ST3*c*_1 of the (3_1)th transistor of the first sub-pixel SP1, a channel ST4*c*_1 of the (4_1)th transistor of the first sub-pixel SP1, and a channel ST7*c*_1 of the (7_1)th transistor of the first sub-pixel SP1.

The first active layer ACL1 may include a channel ST1*c*_2 of the (1_2)th transistor of the second sub-pixel SP2, a channel ST2*c*_2 of the (2_2)th transistor of the second sub-pixel SP2, a channel ST3*c*_2 of the (3_2)th transistor of the second sub-pixel SP2, a channel ST4*c*_2 of the (4_2)th transistor of the second sub-pixel SP2, and a channel ST7*c*_2 of the (7_2)th transistor of the second sub-pixel SP2.

The first active layer ACL1 may include a channel ST1*c*_3 of the (1_3)th transistor of the third sub-pixel SP3, a channel ST2*c*_3 of the (2_3)th transistor of the third sub-pixel SP3, a channel ST3*c*_3 of the (3_3)th transistor of the third sub-pixel SP3, a channel ST4*c*_3 of the (4_3)th transistor of the third sub-pixel SP3, and a channel ST7*c*_3 of the (7_3)th transistor of the third sub-pixel SP3.

Also, the first active layer ACL1 may include a channel ST6*c* obtained by integrating channels of the sixth transistors ST6 of the first to third sub-pixels SP1 to SP3.

Portions of the first active layer ACL1, which are spaced apart from each other with a channel interposed therebetween, may constitute a first electrode and a second electrode of each of the transistors ST1, ST2, ST3, ST4, ST6, and ST7.

The second active layer ACL2 may include a channel ST5*c*_1 of the (5_1)th transistor of the first sub-pixel SP1, a channel ST5*c*_2 of the (5_2)th transistor of the second sub-pixel SP2, and a channel ST5*c*_3 of the (5_3)th transistor of the third sub-pixel SP3.

Portions of the second active layer ACL2, which are spaced apart from each other with a channel interposed therebetween, may constitute a first electrode and a second electrode of the fifth transistor ST5.

Referring to FIG. 16, channels of transistors performing the same function or the same operation among the transistors ST1 to ST7 of each of the first to third sub-pixels SP1 to SP3 may be located adjacent to each other.

The first transistors ST1 of the first to third sub-pixels SP1 to SP3 may be located in a first channel area ST1A, the second transistors ST2 of the first to third sub-pixels SP1 to SP3 may be located in a second channel area ST2A, the third transistors ST3 of the first to third sub-pixels SP1 to SP3 may be located in a third channel area ST3A, the fourth transistors ST4 of the first to third sub-pixels SP1 to SP3 may be located in a fourth channel area ST4A, the fifth transistors ST5 of the first to third sub-pixels SP1 to SP3 may be located in a fifth channel area ST5A, the sixth transistors ST6 of the first to third sub-pixels SP1 to SP3 may be integrated to be located in a sixth channel area ST6A, and the seventh transistors ST7 of the first to third sub-pixels SP1 to SP3 may be located in a seventh channel area ST7A.

For example, the channel ST1*c*_1 of the first transistor ST1 of the first sub-pixel SP1, the channel ST1*c*_2 of the first transistor ST1 of the second sub-pixel SP2, and the channel ST1*c*_3 of the first transistor ST1 of the third sub-pixel SP3 may be located in the first channel area ST1A.

The channel ST2*c*_1 of the second transistor ST2 of the first sub-pixel SP1, the channel ST2*c*_2 of the second transistor ST2 of the second sub-pixel SP2, and the channel ST2*c*_3 of the second transistor ST2 of the third sub-pixel SP3 may be located in the second channel area ST2A.

The channel ST3*c*_1 of the third transistor ST3 of the first sub-pixel SP1, the channel ST3*c*_2 of the third transistor ST3 of the second sub-pixel SP2, and the channel ST3*c*_3 of the third transistor ST3 of the third sub-pixel SP3 may be located in the third channel area ST3A.

The channel ST4*c*_1 of the fourth transistor ST4 of the first sub-pixel SP1, the channel ST4*c*_2 of the fourth transistor ST4 of the second sub-pixel SP2, and the channel ST4*c*_3 of the fourth transistor ST4 of the third sub-pixel SP3 may be located in the fourth channel area ST4A.

The channel ST5*c*_1 of the fifth transistor ST5 of the first sub-pixel SP1, the channel ST5*c*_2 of the fifth transistor ST5 of the second sub-pixel SP2, and the channel ST5*c*_3 of the fifth transistor ST5 of the third sub-pixel SP3 may be located in the fifth channel area ST5A.

The channel ST6*c* of the sixth transistors ST6 of the first to third sub-pixels SP1 to SP3 may be located in the sixth channel area ST6A. That is, the channels ST6*c* of the sixth transistors ST6 of the first to third sub-pixels SP1 to SP3 may be integrated to be located in the sixth channel area ST6A.

A channel ST7c_1 of the seventh transistor ST7 of the first sub-pixel SP1, a channel ST7c_2 of the seventh transistor ST7 of the second sub-pixel SP2, and a channel ST7c_3 of the seventh transistor ST7 of the third sub-pixel SP3 may be located in the seventh channel area ST7A.

That is, the transistors included in the first pixel PXL1 are not divided according to which sub-pixel the transistors constitute, but may be divided according to functions of the transistors included in the first pixel PXL1.

Accordingly, a channel of another transistor instead of the first transistor ST1 may be omitted from between the channels ST1c_1, ST1c_2, and ST1c_3 included in the first channel area ST1A. Similarly to this, a channel of a transistor performing another function may be omitted from between the channels included in each of the second to seventh channel areas ST2A to ST7A.

In embodiments, a distance between the channel ST1c_1 of the (1_1)th transistor and the channel ST2c_1 of the (2_1)th transistor may be longer than a distance between the channel ST1c_1 of the (1_1)th transistor and the channel ST1c_2 of the (1_2)th transistor.

As the transistors included in the first pixel PXL1 are divided according to functions of the transistors included in the first pixel PXL1, a separation distance required between the first active layer ACL1 and the second active layer ACL2 on a plane may decrease. For example, a distance D5 between a channel of the seventh channel area ST7A and a channel of the fifth channel area ST5A, and a distance D6 between a channel of the fifth channel area ST5A and a channel of the sixth channel area ST6A, may decrease as compared with the existing corresponding distances. Accordingly, a mounting space of pixels can be secured, and a relatively high resolution pixel can be provided.

On a plane, the first channel area ST1A, the second channel area ST2A, the third channel area ST3A, the fourth channel area ST4A, the sixth channel area ST6A, and the seventh channel area ST7A, which are located in the first active layer ACL1, may be located adjacent to each other.

In embodiments, on a plane, the third channel area ST3A and the fourth channel area ST4A may be in contact with each other without any separation distance.

In embodiments, on a plane, a distance between an area located in the first active layer ACL1 and the fifth channel area ST5A located in the second active layer ACL2 may be greater than a distance between areas adjacent to each other among the areas located in the first active layer ACL1.

For example, on a plane, a distance between the second channel area ST2A and the fifth channel area ST5A may be greater than a distance between the second channel area ST2A and the seventh channel area ST7A. On a plane, a distance between the sixth channel area ST6A and the fifth channel area ST5A may be greater than a distance between the sixth channel area ST6A and the fourth channel area ST4A.

In addition, while the channels included in the first channel area ST1A, the second channel area ST2A, the seventh channel area ST7A, and the fifth channel area ST5A are located along the second direction DR2 on a plane, the channels included in the third channel area ST3A, the fourth channel area ST4A, and the sixth channel area ST6A may be located along the first direction DR1 on a plane. That is, the channels included in the first pixel PXL1 may be located along different directions.

The present disclosure is not limited to the structure in which the channels shown in FIG. 16 are located, and the channels may be variously located in some embodiments. For example, the channels ST1c_1, ST1c_2, and ST1c_3 located in the first channel area ST1A may be located differently from the structure the channels are located in FIG. 16. Similarly to this, channels located in other channel areas may be located differently from the structure in which the channels are located in FIG. 16.

Referring to FIGS. 16 and 17, patterns of a first electrode layer CEL1 and a second electrode layer CEL2 are additionally illustrated. The first electrode layer CEL1 may include gate electrodes ST1g_1, ST1g_2, ST1g_3, ST2g, ST3g, ST4g, ST6g, and ST7g of the transistors ST1, ST2, ST3, ST4, ST6, and ST7. The second electrode layer CEL2 may include a gate electrode ST5g of the fifth transistor ST5.

Referring to FIGS. 3, 16, and 17, the gate electrode ST1g_1 of the first transistor ST1 of the first sub-pixel SP1 may overlap with the channel ST1c_1 of the first transistor ST1 of the first sub-pixel SP1. The gate electrode ST1g_2 of the first transistor ST1 of the second sub-pixel SP2 may overlap with the channel ST1c_2 of the first transistor ST1 of the second sub-pixel SP2. The gate electrode ST1g_3 of the first transistor ST1 of the third sub-pixel SP3 may overlap with the channel ST1c_3 of the first transistor ST1 of the third sub-pixel SP3.

In the case of gate electrodes of the second transistors ST2 of the first to third sub-pixels SP1 to SP3, the gate electrodes may be integrated into one gate electrode ST2g. Accordingly, one second gate electrode ST2g may be located in the second channel area ST2A. The gate electrode ST2g of the second transistor ST2 may overlap with the channel ST2c_1 of the second transistor ST2 of the first sub-pixel SP1, the channel ST2c_2 of the second transistor ST2 of the second sub-pixel SP2, and the channel ST2c_3 of the second transistor ST2 of the third sub-pixel SP3.

In the case of gate electrodes of the third transistors ST3 of the first to third sub-pixels SP1 to SP3, the gate electrodes may be integrated into one gate electrode ST3g. Accordingly, one third gate electrode ST3g may be located in the third channel area ST3A. The gate electrode ST3g of the third transistor ST3 may overlap with the channel ST3c_1 of the third transistor ST3 of the first sub-pixel SP1, the channel ST3c_2 of the third transistor ST3 of the second sub-pixel SP2, and the channel ST3c_3 of the third transistor ST3 of the third sub-pixel SP3.

In the case of gate electrodes of the fourth transistors ST4 of the first to third sub-pixels SP1 to SP3, the gate electrodes may be integrated into one gate electrode ST4g. Accordingly, one fourth gate electrode ST4g may be located in the fourth channel area ST4A. The gate electrode ST4g of the fourth transistor ST4 may overlap with the channel ST4c_1 of the fourth transistor ST4 of the first sub-pixel SP1, the channel ST4c_2 of the fourth transistor ST4 of the second sub-pixel SP2, and the channel ST4c_3 of the fourth transistor ST4 of the third sub-pixel SP3.

In the case of gate electrodes of the fifth transistors ST5 of the first to third sub-pixels SP1 to SP3, the gate electrodes may be integrated into one gate electrode ST5g. Accordingly, one fifth gate electrode ST5g may be located in the fifth channel area ST5A. The gate electrode ST5g of the fifth transistor ST5 may overlap with the channel ST5c_1 of the fifth transistor ST5 of the first sub-pixel SP1, the channel ST5c_2 of the fifth transistor ST5 of the second sub-pixel SP2, and the channel ST5c_3 of the fifth transistor ST5 of the third sub-pixel SP3.

In the case of gate electrodes of the sixth transistors ST6 of the first to third sub-pixels SP1 to SP3, the gate electrodes may be integrated into one gate electrode ST6g. Accordingly, one sixth gate electrode ST6g may be located in the sixth channel area ST6A. The gate electrode ST6*g* may overlap with the channel ST6*c* of the sixth transistor ST6.

In the case of gate electrodes of the seventh transistors ST7 of the first to third sub-pixels SP1 to SP3, the gate electrodes may be integrated into one gate electrode ST7*g*. Accordingly, one seventh gate electrode ST7*g* may be located in the seventh channel area ST7A. The gate electrode ST7*g* of the seventh transistor ST7 may overlap with the channel ST7*c*_1 of the seventh transistor ST7 of the first sub-pixel SP1, the channel ST7*c*_2 of the seventh transistor ST7 of the second sub-pixel SP2, and the channel ST7*c*_3 of the seventh transistor ST7 of the third sub-pixel SP3.

In addition, as the transistors included in the first pixel PXL1 are divided according to function of the transistors included in the first pixel PXL1, on a plane, a separation distance required between a gate electrode overlapping with the first active layer ACL1 and a gate electrode overlapping with the second active layer ACL2 may decrease.

For example, a distance D7 between the seventh gate electrode ST7*g* and the fifth gate electrode ST5*g*, and a distance D8 between the sixth gate electrode ST6*g* and the fifth gate electrode ST5*g*, may decrease as compared with the existing corresponding distances. Accordingly, a mounting space of pixels can be secured, and a high resolution pixel can be provided.

For convenience of description, in the present disclosure, a planar layout of contact holes OCTH, a third electrode layer CEL3, via holes VIAH, and a fourth electrode layer CEL4 of the pixel configured with the sub-pixels shown in FIG. 15 is omitted, but the contact holes OCTH, the third electrode layer CEL3, the via holes VIAH, and the fourth electrode layer CEL4 may be located similarly to as described in FIGS. 10 to 13.

For example, some patterns of the third electrode layer CEL3 may constitute a first sub-gate line SGL1, the second sub-gate line SGL2, a third sub-gate line SGL3, a fourth sub-gate line SGL4, a first sub-emission control line SEL1, and a second sub-emission control line SEL2.

Some patterns of the fourth electrode layer CEL4 may constitute an initialization line VINTL, a reference power line including a reference power voltage node VRFN, a first power voltage line VDDL, a first data line DT_1, a second data line DT_2, and a third data line DT_3.

Figure 18:
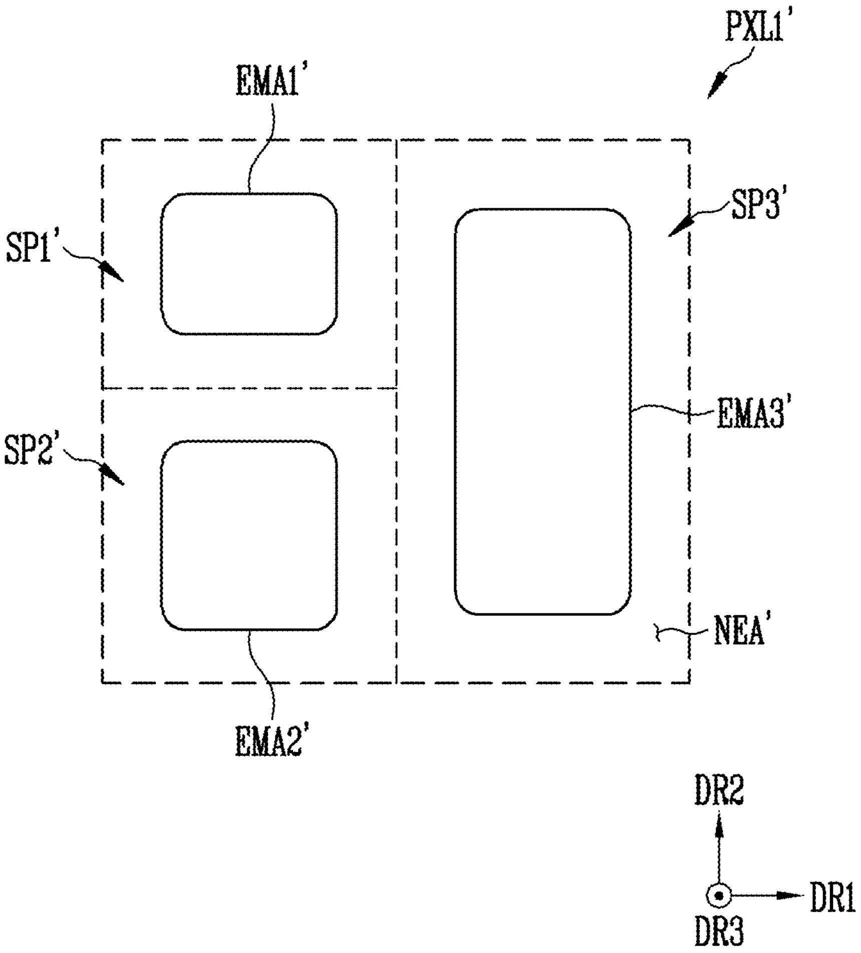
FIG. 18 is a plan view illustrating one or more other embodiments of the one of the pixels shown in FIG. 5.

FIG. 18 is a plan view illustrating one or more other embodiments of the one of the pixels shown in FIG. 5.

Referring to FIG. 18, a first pixel PXL1' may include first to third sub-pixels SP1' to SP3'.

The first sub-pixel SP1' may include a first emission area EMA1', and a non-emission area NEA' at the periphery of the first emission area EMA1'. The second sub-pixel SP2' may include a second emission area EMA2', and the non-emission area NEA' at the periphery of the second emission area EMA2'. The third sub-pixel SP3' may include a third emission area EMA3', and the non-emission area NEA' at the periphery of the third emission area EMA3'.

The first sub-pixel SP1' and the second sub-pixel SP2' may be arranged in the second direction DR2. The third sub-pixel SP3' may be located in the first direction DR1 with respect to each of the first and second sub-pixels SP1' and SP2'.

The second sub-pixel SP2' may have an area that is greater than an area of the first sub-pixel SP1', and the third sub-pixel SP3' may have an area that is greater than the area of the second sub-pixel SP2'. Accordingly, the second emission area EMA2' may have an area that is greater than an area of the first emission area EMA1', and the third emission area EMA3' may have an area that is greater than the area of the second emission area EMA2'. However, embodiments are not limited thereto. For example, the first and second sub-pixels SP1' and SP2' may substantially have the same area, and the third sub-pixel SP3' may have an area that is greater than the area of each of the first and second sub-pixels SP1' and SP2'. As such, the areas of the first to third sub-pixels SP1' to SP3' may be variously modified in some embodiments.

Figure 19:
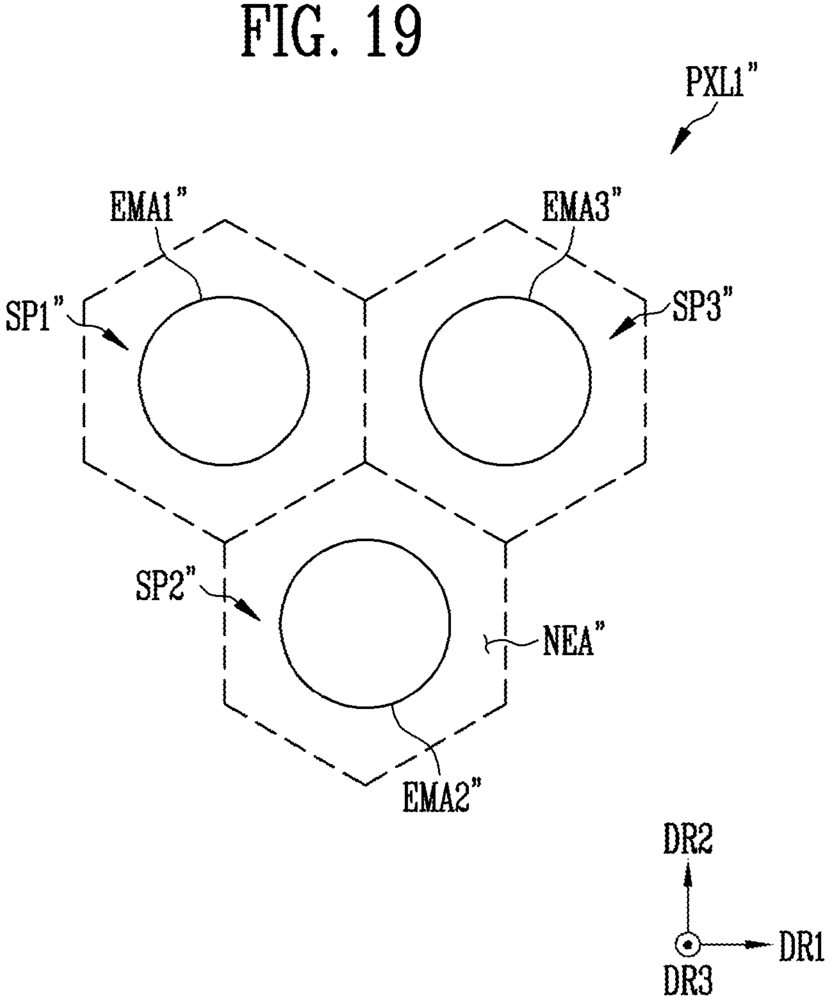
FIG. 19 is a plan view illustrating still one or more other embodiments of the one of the pixels shown in FIG. 5.

FIG. 19 is a plan view illustrating still one or more other embodiments of the one of the pixels shown in FIG. 5.

Referring to FIG. 19, a first pixel PXL1" may include first to third sub-pixels SP1" to SP3". The first sub-pixel SP1" may include a first emission area EMA1", and a non-emission area NEA" at the periphery of the first emission area EMA1". The second sub-pixel SP2" may include a second emission area EMA2", and the non-emission area NEA" at the periphery of the second emission area EMA2". The third sub-pixel SP3" may include a third emission area EMA3", and the non-emission area NEA" at the periphery of the third emission area EMA3".

The first to third sub-pixels SP1" to SP3" may have polygonal shapes when viewed in the third direction DR3. For example, the shapes of the first to third sub-pixels SP1" to SP3" may be hexagonal shapes as shown in FIG. 19.

The first to third emission areas EMA1" to EMA3" may have circular shapes when viewed in the third direction DR3. However, embodiments are not limited thereto. For example, each of the first to third emission areas EMA1" to EMA3" may have a polygonal shape.

The first and third sub-pixels SP1" and SP3" may be arranged in the first direction DR1. The second sub-pixel SP2" may be located in a direction (or diagonal direction) inclined by an acute angle, based on the second direction DR2, with respect to the first sub-pixel SP1".

The arrangements of the sub-pixels, which are shown in FIGS. 6, 18, and 19, are merely illustrative, and embodiments are not limited thereto. Each pixel may include two or more sub-pixels, and the sub-pixels may be arranged in various manners. Each of the sub-pixels may have various shapes, and an emission area of the sub-pixel may have various shapes.

Figure 20:
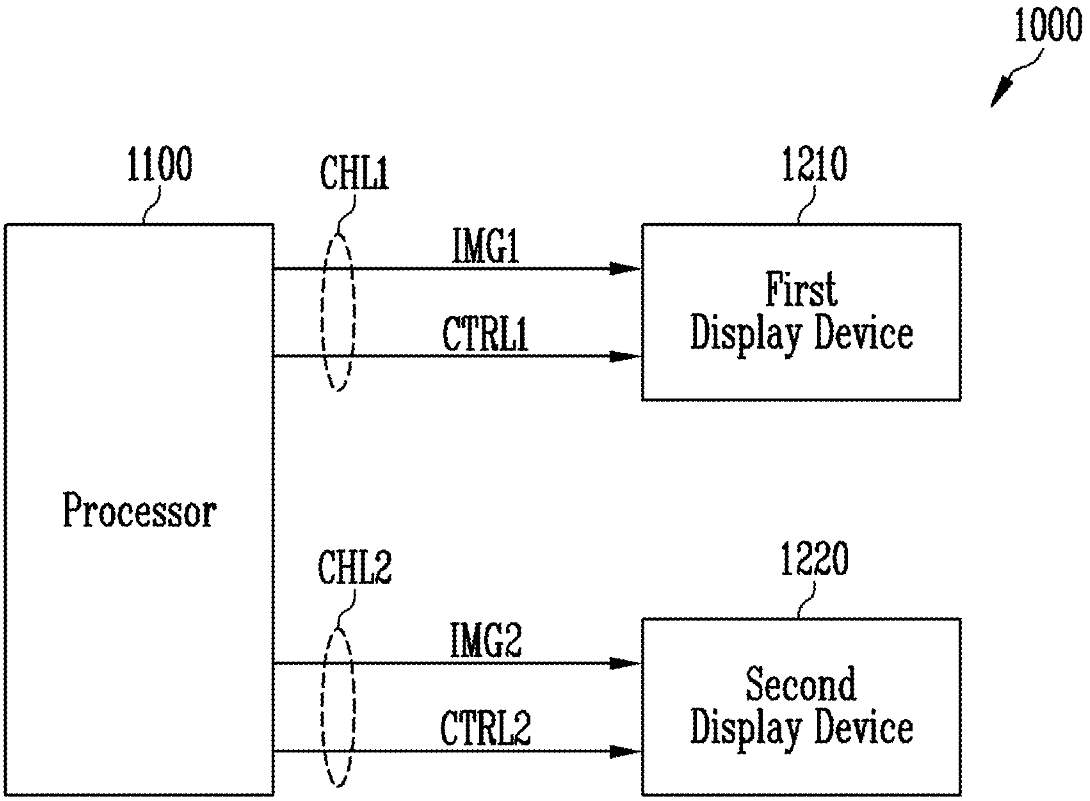
FIG. 20 is a block diagram illustrating one or more embodiments of a display system.

FIG. 20 is a block diagram illustrating one or more embodiments of a display system.

Referring to FIG. 20, a display system 1000 may include a processor 1100 and one or more display devices 1210 and 1220.

The processor 1100 may perform various tasks and various calculations. In embodiments, the processor 1100 may include an Application Processor (AP), a Graphics Processing Unit (GPU), a microprocessor, a Central Processing Unit (CPU), and the like. The processor 1100 may be connected to other components of the display system 1000 through a bus system to control the components of the display system 1000.

In FIG. 20, it is illustrated that the display system 1000 includes first and second display devices 1210 and 1220. The processor 1100 may be connected to the first display device 1210 through a first channel CHL1, and may be connected to the second display device 1220 through a second channel CHL2.

Through the first channel CHL1, the processor 1100 may transmit first image data IMG1 and a first control signal CTRL1 to the first display device 1210. The first display device 1210 may display an image, based on the first image data IMG1 and the first control signal CTRL1. The first display device 1210 may be configured identically to the display device 100 described with reference to FIG. 1. The first image data IMG1 and the first control signal CTRL1 may be respectively provided as the input image data IMG and the control signal CTRL, which are shown in FIG. 1.

Through the second channel CHL2, the processor 1100 may transmit second image data IMG2 and a second control signal CTRL2 to the second display device 1220. The second display device 1220 may display an image, based on the second image data IMG2 and the second control signal CTRL2. The second display device 1220 may be configured identically to the display device 100 described with reference to FIG. 1. The second image data IMG2 and the second control signal CTRL2 may be respectively provided as the input image data IMG and the control signal CTRL, which are shown in FIG. 1.

The display system 1000 may include a computing system for providing an image display function, such as a portable computer, a mobile phone, a smartphone, a tablet personal computer (PC), a smart watch, a watch phone, a portable multimedia player (PMP), a navigation system, or an ultra-mobile computer (UMPC). The display system 1000 may include at least one of a head-mounted display (HMD) device, a virtual reality (VR) device, a mixed reality (MR) device, and an augmented reality (AR) device.

Figure 21:
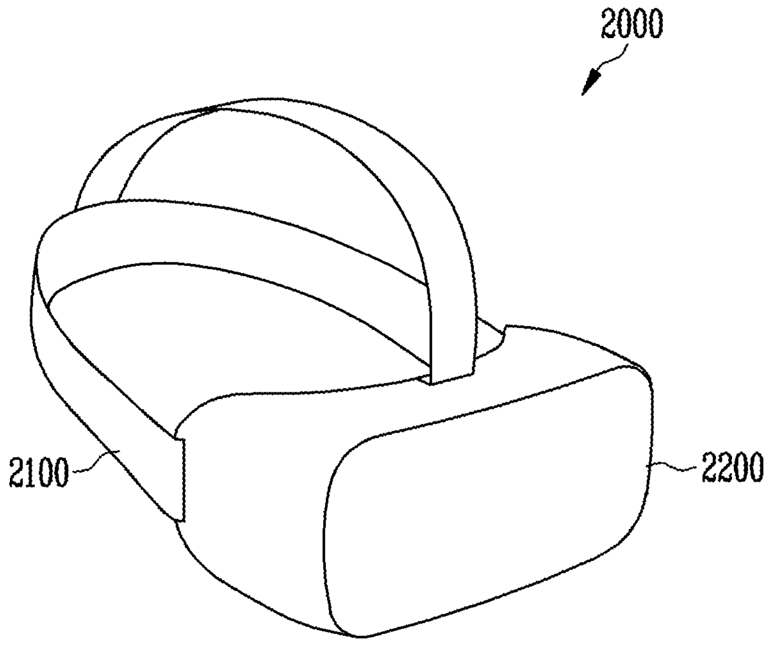
FIG. 21 is a perspective view illustrating an application example of the display system shown in FIG. 20.

FIG. 21 is a perspective view illustrating an application example of the display system shown in FIG. 20.

Referring to FIG. 21, the display system 1000 shown in FIG. 20 may be applied to a head-mounted display device 2000. The head-mounted display device 2000 may be a wearable electronic device that can be worn on a head of a user.

The head-mounted display device 2000 may include a head-mounting band 2100 and a display device accommodating case 2200. The head-mounting band 2100 may be connected to the display device accommodating case 2200. The head-mounting band 2100 may include a horizontal band and/or a vertical band, which may be used to fix the head-mounted display device 2000 to the head of the user. The horizontal band may be configured to surround a side portion of the head of the user, and the vertical band may be configured to surround an upper portion of the head of the user. However, embodiments are not limited thereto. For example, the head-mounting band 2100 may be implemented in the form of a glasses frame, a helmet, or the like.

The display device accommodating case 2200 may accommodate the first and second display devices 1210 and 1220 shown in FIG. 20. The display device accommodating case 2200 may further accommodate the processor 1100 shown in FIG. 20.

Figure 22:
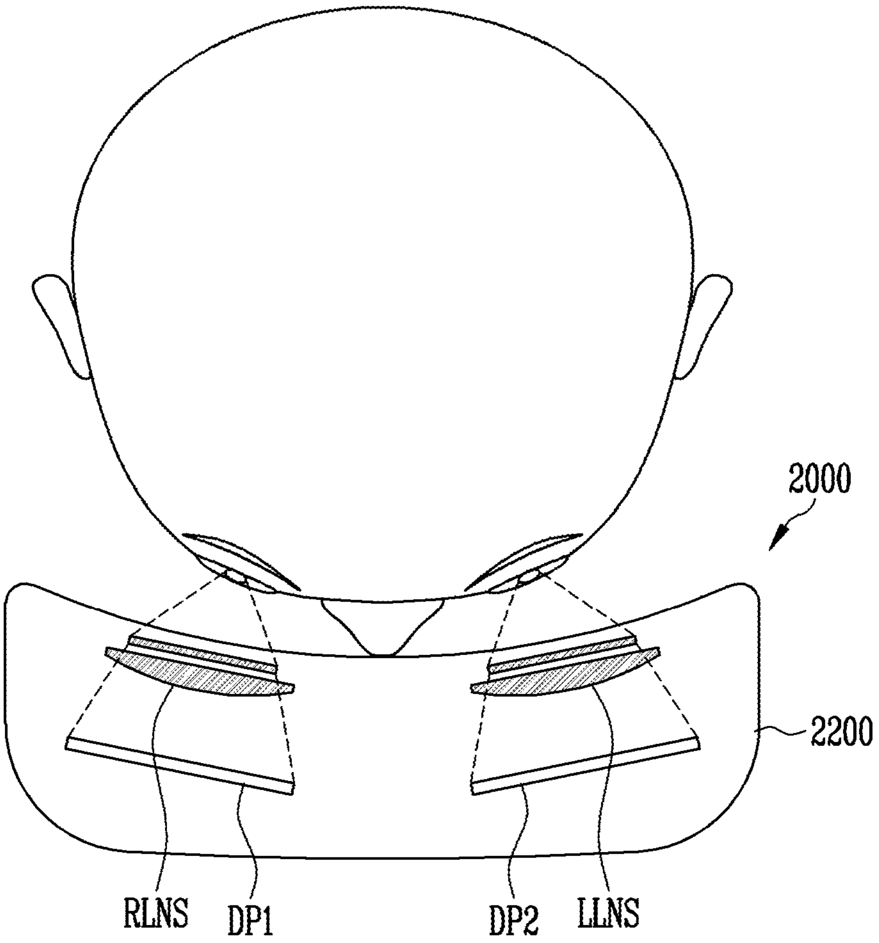
FIG. 22 is a view illustrating a head-mounted display device shown in FIG. 21, which is worn by a user.

FIG. 22 is a view illustrating the head-mounted display device shown in FIG. 21, which is worn by a user.

Referring to FIG. 22, a first display panel DP1 of the first display device 1210 and a second display panel DP2 of the second display device 1220 may be located in the head-mounted display device 2000. The head-mounted display device 2000 may further include one or more lenses LLNS and RLNS.

In the display device accommodating case 2200, a right-eye lens RLNS may be located between the first display panel DP1 and a right eye of the user. In the display device accommodating case 2200, a left-eye lens LLNS may be located between the second display panel DP2 and a left eye of the user.

An image output from the first display panel DP1 may be viewed by the right eye of the user through the right-eye lens RLNS. The right-eye lens RLNS may refract light emitted from the first display panel DP1 to face the right eye of the user. The right-eye lens RLNS may perform an optical function for adjusting a viewing distance between the first display panel DP1 and the right eye of the user.

An image output from the second display panel DP2 may be viewed by the left eye of the user through the left-eye lens LLNS. The left-eye lens LLNS may refract light emitted from the second display panel DP2 to face the left eye of the user. The left-eye lens LLNS may perform an optical function for adjusting a viewing distance between the second display panel DP2 and the left eye of the user.

In embodiments, each of the right-eye lens RLNS and the left-eye lens LLNS may include an optical lens having a pancake-shaped section. In embodiments, each of the right-eye lens RLNS and the left-eye lens LLNS may include a multi-channel lens including sub-areas having different optical characteristics. Each display panel may output images respectively corresponding to the sub-areas of the multi-channel lens, and the output images may be viewed by the user while respectively passing through corresponding sub-areas.

In the pixel and the display device having the same in accordance with the present disclosure, the pixel can be implemented using a transistor (e.g., MOSFET) suitable for high resolution.

Embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment(s) may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims, with functional equivalents thereof to be included therein.

What is claimed is:

1. A display device comprising:

a first sub-pixel comprising a first sub-pixel circuit, and a first light-emitting element configured to emit light based on a first data signal;

a second sub-pixel comprising a second sub-pixel circuit, and a second light-emitting element configured to emit light based on a second data signal; and a third sub-pixel comprising a third sub-pixel circuit, and a third light-emitting element configured to emit light based on a third data signal, wherein channels of transistors configured to perform a same function among transistors in the first, second, and third sub-pixel circuits are adjacent to each other, wherein a channel of a (1_1)th transistor of the first sub-pixel, a channel of a (1_2)th transistor of the second sub-pixel, and a channel of a (1_3)th transistor of the third sub-pixel extend in a first direction, and wherein the channel of the (1_1)th transistor of the first sub-pixel, the channel of the (1_2)th transistor of the second sub-pixel, and the channel of the (1_3)th transistor of the third sub-pixel are spaced apart from each other in a second direction perpendicular to the first direction.

2. The display device of claim 1, wherein the first sub-pixel circuit comprises the (1_1)th transistor configured to generate a driving current based on the first data signal, and a (2_1)th transistor configured to provide the first data signal to the (1_1)th transistor in response to a first gate signal provided to a first sub-gate line, wherein the second sub-pixel circuit comprises the (1_2)th transistor configured to generate a driving current based on the second data signal, and a (2_2)th transistor configured to provide the second data signal to the (1_2)th transistor in response to the first gate signal, wherein the third sub-pixel circuit comprises the (1_3)th transistor configured to generate a driving current based on the third data signal, and a (2_3)th transistor configured to provide the third data signal to the (1_3)th transistor in response to the first gate signal, wherein the channel of the (1_1)th transistor, the channel of the (1_2)th transistor, and the channel of the (1_3)th transistor are adjacent to each other, and wherein a channel of the (2_1)th transistor, a channel of the (2_2)th transistor, and a channel of the (2_3)th transistor are adjacent to each other.

3. The display device of claim 2, wherein a distance between the channel of the (1_1)th transistor and the channel of the (2_1)th transistor is greater than a distance between the channel of the (1_1)th transistor and the channel of the (1_2)th transistor in plan view.

4. The display device of claim 2, wherein the channel of the (1_1)th transistor, the channel of the (1_2)th transistor, and the channel of the (1_3)th transistor are in a first channel area, and wherein the channel of the (2_1)th transistor, the channel of the (2_2)th transistor, and the channel of the (2_3)th transistor are in a second channel area.

5. The display device of claim 4, wherein a (1_1)th gate electrode, a (1_2)th gate electrode, and a (1_3)th gate electrode are in the first channel area, and wherein one gate electrode is in a channel area comprising a transistor that is other than transistors configured to generate a driving current.

6. The display device of claim 5, wherein one second gate electrode is in the second channel area.

7. The display device of claim 6, wherein the second gate electrode overlaps the channel of the (2_1)th transistor, the channel of the (2_2)th transistor, and the channel of the (2_3)th transistor in plan view.

8. The display device of claim 5, wherein some of channels in a pixel are arranged along the first direction, and others of the channels in the pixel are arranged along the second direction.

9. A display device comprising:

a first sub-pixel comprising a first sub-pixel circuit, and a first light-emitting element configured to emit light based on a first data signal;

a second sub-pixel comprising a second sub-pixel circuit, and a second light-emitting element configured to emit light based on a second data signal; and a third sub-pixel comprising a third sub-pixel circuit, and a third light-emitting element configured to emit light based on a third data signal, wherein channels of transistors configured to perform a same function among transistors in the first, second, and third sub-pixel circuits are adjacent to each other, wherein the first sub-pixel circuit comprises a (1_1)th transistor configured to generate a driving current based on the first data signal, and a (2_1)th transistor configured to provide the first data signal to the (1_1)th transistor in response to a first gate signal provided to a first sub-gate line, wherein the second sub-pixel circuit comprises a (1_2)th transistor configured to generate a driving current based on the second data signal, and a (2_2)th transistor configured to provide the second data signal to the (1_2)th transistor in response to the first gate signal, wherein the third sub-pixel circuit comprises a (1_3)th transistor configured to generate a driving current based on the third data signal, and a (2_3)th transistor configured to provide the third data signal to the (1_3)th transistor in response to the first gate signal, wherein a channel of the (1_1)th transistor, a channel of the (1_2)th transistor, and a channel of the (1_3)th transistor are adjacent to each other, wherein a channel of the (2_1)th transistor, a channel of the (2_2)th transistor, and a channel of the (2_3)th transistor are adjacent to each other, wherein the channel of the (1_1)th transistor, the channel of the (1_2)th transistor, and the channel of the (1_3)th transistor are in a first channel area, wherein the channel of the (2_1)th transistor, the channel of the (2_2)th transistor, and the channel of the (2_3)th transistor are in a second channel area wherein a (1_1)th gate electrode, a (1_2)th gate electrode, and a (1_3)th gate electrode are in the first channel area, wherein one gate electrode is in a channel area comprising a transistor that is other than transistors configured to generate a driving current, wherein some of channels in a pixel are arranged along a first direction, and others of the channels in the pixel are arranged along a second direction perpendicular to the first direction, wherein the (1_1)th transistor is connected between a power node configured to provide a power voltage and a (1_1)th node, wherein the (1_2)th transistor is connected between the power node and a (1_2)th node, wherein the (1_3)th transistor is connected between the power node and a (1_3)th node, wherein the first sub-pixel circuit further comprises a (3_1)th transistor connected between the (1_1)th gate electrode of the (1_1)th transistor and the (1_1)th node, the (3_1)th transistor configured to operate in response to a second gate signal provided to a second sub-gate line, wherein the second sub-pixel circuit further comprises a (3_2)th transistor connected between the (1_2)th gate electrode of the (1_2)th transistor and the (1_2)th node, the (3_2)th transistor configured to operate in response to the second gate signal, and wherein the third sub-pixel circuit further comprises a (3_3)th transistor connected between the (1_3)th gate electrode of the (1_3)th transistor and the (1_3)th node, the (3_3)th transistor configured to operate in response to the second gate signal.

10. The display device of claim 9, wherein a channel of the (3_1)th transistor is not between the channel of the (1_1)th transistor and the channel of the (1_2)th transistor.

11. The display device of claim 9, wherein a channel of the (3_1)th transistor, a channel of the (3_2)th transistor, and a channel of the (3_3)th transistor are in a third channel area, wherein the channels in the third channel area are arranged along the first direction, and wherein the channels in the first channel area are arranged along the second direction.

12. The display device of claim 11, wherein one third gate electrode is in the third channel area.

13. The display device of claim 12, wherein the third gate electrode overlaps the channel of the (3_1)th transistor, the channel of the (3_2)th transistor, and the channel of the (3_3)th transistor in plan view.

14. The display device of claim 13, wherein the first sub-pixel circuit further comprises a (4_1)th transistor connected between the (1_1)th node and an anode electrode of the first light-emitting element, the (4_1)th transistor configured to operate in response to a third gate signal provided to a sub-emission control line, wherein the second sub-pixel circuit further comprises a (4_2)th transistor connected between the (1_2)th node and an anode electrode of the second light-emitting element, the (4_2)th transistor configured to operate in response to the third gate signal, and wherein the third sub-pixel circuit further comprises a (4_3)th transistor connected between the (1_3)th node and an anode electrode of the third light-emitting element, the (4_3)th transistor configured to operate in response to the third gate signal.

15. The display device of claim 14, wherein a channel of the (4_1)th transistor, a channel of the (4_2)th transistor, and a channel of the (4_3)th transistor are in a fourth channel area, and wherein the third channel area contacts the fourth channel area.

16. The display device of claim 15, wherein one fourth gate electrode is in the fourth channel area, and wherein the fourth gate electrode overlaps the channel of the (4_1)th transistor, the channel of the (4_2)th transistor, and the channel of the (4_3)th transistor in plan view.

17. The display device of claim 16, further comprising:

a third electrode layer constituting the first and second sub-gate lines and the sub-emission control line;

a fourth electrode layer constituting a first data line configured to provide the first data signal, a second data line configured to provide the second data signal, and a third data line configured to provide the third data signal; and via holes through which the fourth electrode layer is connected to the third electrode layer.

18. The display device of claim 17, wherein one of the via holes connected to the anode electrode of the second light-emitting element and the (4_1)th transistor overlap in plan view.

19. The display device of claim 18, wherein the first sub-pixel circuit further comprises a (5_1)th transistor connected between the anode electrode of the first light-emitting element and an initialization voltage node configured to receive an initialization voltage, wherein the second sub-pixel circuit further comprises a (5_2)th transistor connected between the anode electrode of the second light-emitting element and the initialization voltage node, and wherein the third sub-pixel circuit further comprises a (5_3)th transistor connected between the anode electrode of the third light-emitting element and the initialization voltage node.

20. The display device of claim 19, wherein a channel of the (5_1)th transistor, a channel of the (5_2)th transistor, and a channel of the (5_3)th transistor are in a fifth channel area, and wherein a distance between the third channel area and the fifth channel area is greater than a distance between the third channel area and the first channel area.

21. An electronic device comprising a display device comprising:

a first sub-pixel comprising a first sub-pixel circuit, and a first light-emitting element configured to emit light based on a first data signal;

a second sub-pixel comprising a second sub-pixel circuit, and a second light-emitting element configured to emit light based on a second data signal; and a third sub-pixel comprising a third sub-pixel circuit, and a third light-emitting element configured to emit light based on a third data signal, wherein channels of transistors configured to perform a same function among transistors in the first, second, and third sub-pixel circuits are adjacent to each other, wherein a channel of a (1_1)th transistor of the first sub-pixel, a channel of a (1_2)th transistor of the second sub-pixel, and a channel of a (1_3)th transistor of the third sub-pixel extend in a first direction, and wherein the channel of the (1_1)th transistor of the first sub-pixel, the channel of the (1_2)th transistor of the second sub-pixel, and the channel of the (1_3)th transistor of the third sub-pixel are spaced apart from each other in a second direction perpendicular to the first direction.

22. The electronic device of claim 21, wherein the electronic device comprises a smartphone, a television, a monitor, a tablet, an electric vehicle, a mobile phone, a tablet personal computer (PC), a mobile communication terminal, an electronic notebook, an electronic book, a portable multimedia player (PMP), a navigation device, an ultra-mobile PC (UMPC), a laptop computer, a billboard, an Internet of Things (IoT) device, a smartwatch, a watch phone, or a head-mounted display (HMD).

* * * * *